US012755132B2

(12) United States Patent
Asad et al.

(10) Patent No.: US 12,755,132 B2
(45) Date of Patent: Oct. 6, 2026

(54) MAPPING NEURAL NETWORKS TO HARDWARE

(71) Applicant: Imagination Technologies Limited, Kings Langley (GB)

(72) Inventors: Muhammad Asad, Hertfordshire (GB); Cagatay Dikici, Hertfordshire (GB)

(73) Assignee: Imagination Technologies Limited, Kings Langley (GB)

( * ) Notice: Subject to any disclaimer, the term of this patent is extended or adjusted under 35 U.S.C. 154(b) by 540 days.

(21) Appl. No.: 18/212,347

(22) Filed: Jun. 21, 2023

(65) Prior Publication Data

US 2024/0119254 A1 Apr. 11, 2024

(30) Foreign Application Priority Data

Jun. 21, 2022 (GB) ...................................... 2209110

(51) Int. Cl.
*G06N 3/04* (2023.01)
*G06N 3/063* (2023.01)

(52) U.S. Cl.
CPC ............... *G06N 3/04* (2013.01); *G06N 3/063* (2013.01)

(58) Field of Classification Search
None
See application file for complete search history.

(56) References Cited

U.S. PATENT DOCUMENTS 10,972,126 B2 * 4/2021 Fenney ................... H03M 7/40
11,176,449 B1 * 11/2021 Nez ....................... G06F 17/153
2017/0272750 A1 * 9/2017 An ....................... H04N 19/176
2018/0114569 A1 * 4/2018 Strachan ................. G11C 11/54
2019/0303750 A1 * 10/2019 Kumar .................. G06F 7/5443
2020/0026992 A1 * 1/2020 Zhang .................. G06N 3/0442
2020/0193275 A1 * 6/2020 Chen ................... G06F 13/4208
2021/0174108 A1 * 6/2021 Petrizio ................ G06N 3/0464
2021/0182684 A1 6/2021 Zappi et al.

FOREIGN PATENT DOCUMENTS

EP 3104309 A2 12/2016
GB 2599909 A 4/2022
WO 2021126194 A1 6/2021

OTHER PUBLICATIONS

Garcia et al; "A binary-tree architecture for scheduling real-time systems with hard and soft tasks"; Integrated Circuits and System Design, 1999 Proceedings.; Sep. 29, 1999, pp. 78-81.

* cited by examiner

*Primary Examiner* — Kaveh Abrishamkar
(74) *Attorney, Agent, or Firm* — Potomac Law Group, PLLC; Vincent M DeLuca

(57) ABSTRACT

A method of mapping a neural network to hardware uses a binary tree to assess how to split a layer of the neural network into a plurality of hardware passes by determining a starting value of a current depth within the binary tree and arranging the set of coefficients into groups, each corresponding to a node at the current depth. A compressed size of at least one group of coefficients at the current depth is calculated and it is determined whether termination criteria are satisfied. In response to determining that the termination criteria are not satisfied, the current depth is updated and the calculating and determining steps are repeated. In response to determining that termination criteria are satisfied, data is output which defines each of the plurality of hardware passes, wherein the data is dependent upon the current depth.

14 Claims, 12 Drawing Sheets

MAPPING NEURAL NETWORKS TO HARDWARE

CROSS-REFERENCE TO RELATED APPLICATIONS AND CLAIM OF PRIORITY

This application claims foreign priority under 35 U.S.C. 119 from United Kingdom patent application No. 2209110.2 filed on 21 Jun. 2022, which is incorporated herein by reference in its entirety.

BACKGROUND

Many neural networks (NN) comprise an input layer, an output layer and multiple hidden layers, e.g. convolutional NN. For each layer in the NN, an array of weights (or coefficients) is computed in advance (e.g. as part of a training stage) and stored in memory so that they can be used at run time, when they are applied to the input data. These weights remain unchanged during the execution of the NN. The array of weights may be a multi-dimensional array of weights and the input data may be a multi-dimensional array of data. At run time, these weights are read from memory. The size of the array of weights may differ for different layers in a NN (e.g. in particular the depth of an array may vary significantly across different layers) and for some layers may be very large. To reduce the size of memory that is required to store the weights and the bandwidth used to read the weights from memory, the weights may be stored in compressed form and then decompressed prior to use. The compression may be performed in an offline process.

The embodiments described below are provided by way of example only and are not limiting of implementations which solve any or all of the disadvantages of known methods handling data.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A method of mapping a neural network to hardware is described. The method uses a binary tree to assess how to split a layer of the neural network into a plurality of hardware passes by determining a starting value of a current depth within the binary tree and arranging the set of coefficients into groups, each corresponding to a node at the current depth. A compressed size of at least one group of coefficients at the current depth is calculated and it is determined whether termination criteria are satisfied. In response to determining that the termination criteria are not satisfied, the current depth is updated and the calculating and determining steps are repeated. In response to determining that termination criteria are satisfied, data is output which defines each of the plurality of hardware passes, wherein the data is dependent upon the current depth.

A first example provides a method of mapping a neural network to hardware comprising using a binary tree to assess how to split a layer of the neural network into a plurality of hardware passes, each hardware pass reading a subset of the coefficients of the layer from external memory and wherein the coefficients are stored in compressed form in the memory and each node in the binary tree corresponding to a different subset of the coefficients, wherein using the binary tree comprises: (i) determining a starting value of a current depth within the binary tree; (ii) arranging the set of coefficients into groups, each group corresponding to a node at the current depth; (iii) calculating a compressed size of at least one group of coefficients at the current depth; (iv) determining whether termination criteria are satisfied, at least one of the termination criteria being based on a comparison between the calculated compressed size and a hardware size constraint; (v) in response to determining that the termination criteria are not satisfied, updating the current depth and repeating steps (ii)-(iv); and (vi) in response to determining that termination criteria are satisfied, outputting data defining each of the plurality of hardware passes, wherein the data is dependent upon the current depth.

A second example provides a method of implementing a neural network using a hardware accelerator comprising fixed function circuitry, the method comprising using a binary tree to assess how to split a layer of the neural network into a plurality of hardware passes, each hardware pass reading a subset of the coefficients of the layer from external memory and wherein the coefficients are stored in compressed form in the memory and each node in the binary tree corresponding to a different subset of the coefficients, wherein using the binary tree comprises: (i) determining a starting value of a current depth within the binary tree; (ii) arranging the set of coefficients into groups, each group corresponding to a node at the current depth; (iii) calculating a compressed size of at least one group of coefficients at the current depth; (iv) determining whether termination criteria are satisfied, at least one of the termination criteria being based on a comparison between the calculated compressed size and a hardware size constraint; (v) in response to determining that the termination criteria are not satisfied, updating the current depth and repeating steps (ii)-(iv); and (vi) in response to determining that termination criteria are satisfied, outputting data defining each of the plurality of hardware passes, wherein the data is dependent upon the current depth.

The methods described herein may be computer implemented methods.

The method of implementing a neural network may further comprise: executing the layer of the neural network, using the fixed function circuitry, according to the data defining each of the plurality of hardware passes.

The fixed function circuitry may comprise convolution hardware configured to perform one or more convolution operations.

A third example provides a computing device comprising a processor and a memory, wherein the memory is arranged to store computer readable code configured to cause any of the methods described herein to be performed when the code is executed by the processor There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
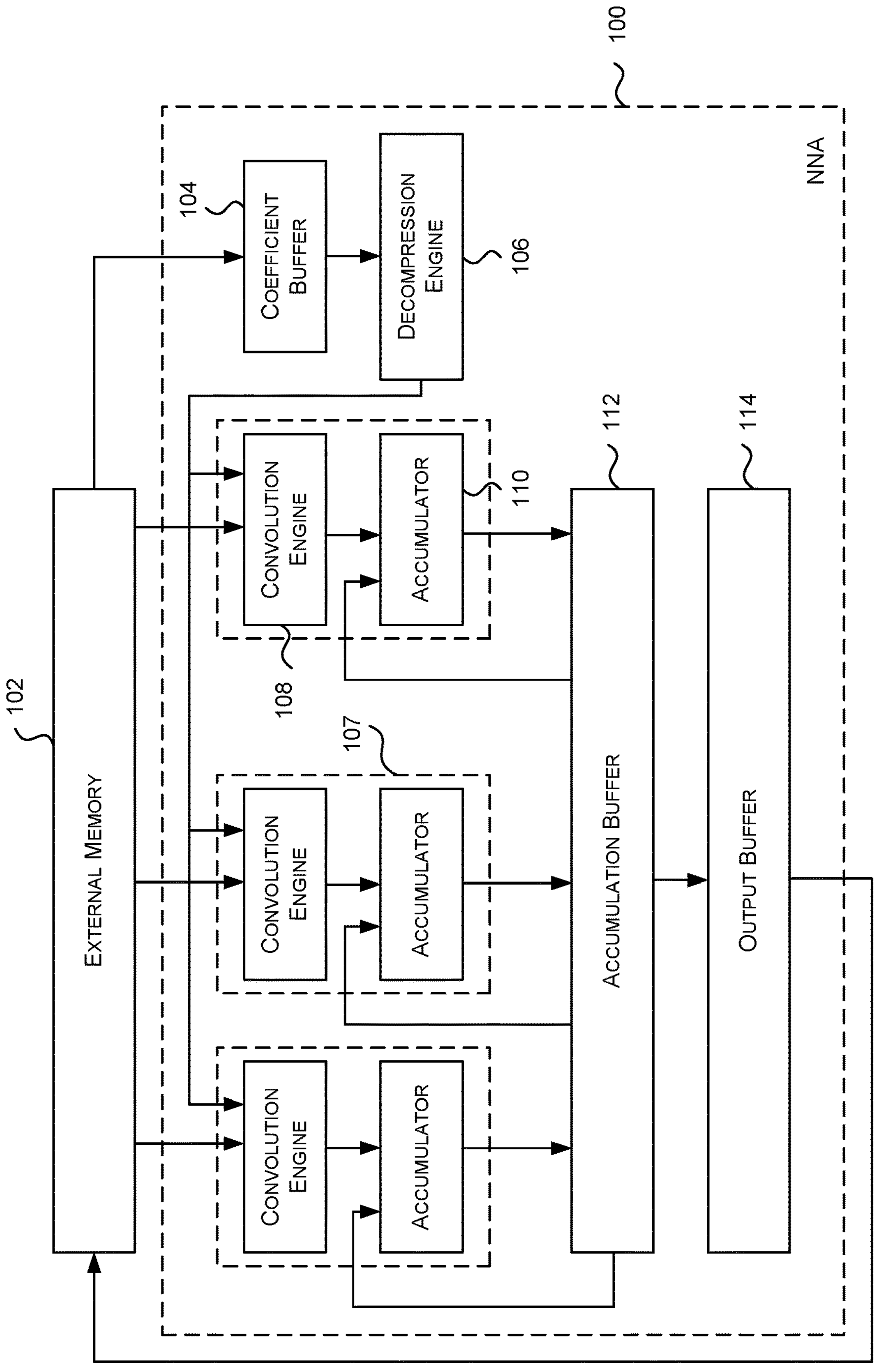
FIG. 1 is a schematic diagram of example NN hardware.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

As described above, the array of weights for a layer in a NN (e.g. a layer in a convolutional NN) may be stored in compressed form in order to reduce the amount of storage required and the bandwidth used to read the weights from memory. The weights may also be referred to as 'coefficients' and the two terms are used interchangeably herein. At run time, the coefficients are read from memory and stored in a buffer (which may be referred to as the coefficient buffer) within the NN hardware (e.g. within a NN accelerator, NNA) before being decompressed and fed into the hardware elements (which may be referred to as 'processing elements') that apply the coefficients to the input data (e.g. into the convolution engines within the NNA). Typically the coefficient buffer is not large enough to store all the coefficients for a NN layer (e.g. because of the large sizes of the arrays and constraints on the space and power available for the buffer) and/or there is insufficient bandwidth available between the memory and the NNA to read all the coefficients from a NN layer into the buffer in the available time (i.e. there is a limit on the amount of data that can be loaded in each clock cycle). As a result, the loading of the coefficients for a layer is divided into a plurality of operations, referred to as 'passes' or 'hardware passes', where each pass involves reading a subset of the compressed coefficients from memory and the amount of data read in each pass does not exceed the capacity of the coefficient buffer and/or the connection (e.g. bus) between the memory where they are stored in compressed form and the buffer. In other examples there may be additional, or alternative, hardware constraints that are used when determining how to divide the coefficients for a NN layer into the plurality of passes, such as the size of the input buffer, the processing throughput of the processing elements, etc. Where there are multiple hardware constraints, the splitting of the coefficients for a layer into passes may be constrained by the tightest of the hardware constraints.

It will be appreciated that as these hardware constraints are implementation specific, the division of the array into passes may need to be performed for each different type or version of hardware on which the NN is implemented and hence the division may form part of the process of mapping the NN to the hardware on which it will be implemented. The mapping is performed as an offline process separate from run time when the coefficients are combined with input data.

The splitting of a layer of NN coefficients into a plurality of passes is generally performed before the compression of the coefficients because coefficients in one pass need to be compressed separately from any coefficients in another pass so that they can be accessed (e.g. read) independently. However, depending upon the compression method used, the two operations (splitting and compression) are not independent because the nature of the splitting can affect the amount of compression that can be achieved.

When splitting of coefficients into passes, there may be criteria which define where splits occur. For example, where the NN layer uses filters (e.g. convolutional filters), the splitting of coefficients into passes may be performed at the filter level such that the coefficients from the same filter are always in the same pass and are not split between passes and the smallest possible pass comprises those coefficients of a single filter, or, where p-splits are used (i.e. splits in the channel dimension), those coefficients of a single filter for those channels in the p-split. In other examples, the smallest possible split may be affected by the compression method used, as described in more detail below, although where a block-based compression method is used, padding with zeros (or zero channels) may be used so that the number of coefficients are a multiple of the block size (e.g. by padding the number of input channels so that it is a multiple of the block size). This ensures that a block (of the block-based compression method) only contains a single spatial location of a single filter.

Whilst dividing the NN layer into a number of passes ensures that the limits of the size of the coefficient buffer and bandwidth of the memory connection (and/or any other hardware constraints) are not exceeded, increasing the number of passes adds both latency and bandwidth (because input data is reloaded into the input buffer for each pass) at run time and if the hardware (e.g. coefficient buffer and/or bus between the memory and the buffer) is not fully utilised in each pass, the splitting of the layer into passes results in the hardware operating inefficiently at run time.

The division of a layer into a plurality of passes may be performed as part of the operation to map a neural network to a particular hardware implementation because it is dependent upon hardware characteristics, e.g. the size of the coefficient buffer and/or the bandwidth between the memory and the NNA. Even though this mapping is performed offline (rather than at run time), it still needs to be performed in an efficient manner, i.e. in terms of computational effort required and time taken, as computational resources and available time are both finite. A NN may need to be mapped many times if it is to be used on multiple different hardware implementations (e.g. hardware implementations with different coefficient buffer sizes, bus bandwidths, etc.).

An example compression method that can be used to compress the coefficients is described in GB patent 2579399. This compression method is a block-based compression method in that it takes groups of data items (which may be referred to as a block of data items) and encodes the data items in the group of data items together. In the method described in GB 2579399, header data is generated (comprising h-bits) for the group as a whole along with a body portion (comprising b-bits) for each of the data items in the group. The header data indicates the number of bits, b, in each of the body portions and this value is used when decompressing the data to reconstruct the decompressed data items from their respective body portions. Using this method, the compression ratio is not fixed and different groups of data items may be compressed by different amounts (e.g. the body portion sizes may differ between groups of data items, although all data items within a group have the same size of body portion) and increasing the number of data items in each group can only maintain or reduce (and not increase) the amount of compression that can be achieved (i.e. increasing the number of data items in a group cannot result in an increase in the compression ratio that is achieved). As noted above, where a block-based compression scheme is used, padding with zeros may be used so that the number of coefficients encoded in each block is the same and so that each block only contains a single spatial location of a single filter (and not multiple spatial locations of the same filter or the same spatial location of multiple filters).

FIG. 1 shows example NN hardware, which may be referred to as a neural network accelerator (NNA) 100, which implements the NN at run time. As described above, the compressed coefficients are stored in external memory 102 and are read into a coefficient buffer 104 in the NNA 100. The compressed coefficients are then decompressed by a decompression engine 106 and output into a plurality of processing elements 107 that collectively combine the coefficients with the input data for the particular NN layer (which may also be read from the external memory 102) to generate the output data for the NN layer. In the example shown in FIG. 1, the NN layer is a convolutional layer and hence the processing elements 107 each comprise a convolution engine 108 and an accumulator 110. The NNA 100 may also comprise one or more buffers such as an accumulation buffer 112 and an output buffer. As shown in FIG. 1, the accumulation buffer 112 receives the outputs from the processing elements 107. The NNA 100 may also comprise one or more input buffers (not shown in FIG. 1) which store the input data after it is read from the external memory 102 and before it is input to the processing elements 107.

An input to the NN may comprise text data, audio data, video data, or multimodal data—for example text data and image data (such as a caption and an associated image). Image processing applications include but are not limited to: image segmentation; image classification; optical character recognition.

An example method of mapping a NN onto hardware (such as onto the hardware shown in FIG. 1) involves evaluating the compression of all possible splits to determine the optimum splitting of coefficients into passes based on the constraints of the hardware (e.g. the size of the coefficient buffer). However this approach takes so long (because of the large number of coefficient splitting possibilities and hence huge search space) that it is not feasible even in offline computing. For example, for bigger layers this may involve evaluating millions of options.

Another example method of mapping a NN onto hardware (such as onto the hardware shown in FIG. 1) uses the uncompressed sizes of the coefficients to determine how to split a NN layer into a plurality of passes. This mapping method comprises splitting the layer into a plurality of passes such that the uncompressed size of the coefficients in each pass satisfies the hardware constraints (e.g. the size of the coefficient buffer, bandwidth of the memory bus, etc.). This splitting method can be performed quickly and using minimal computational resources, as it does not require any determination of the compressed sizes of the coefficients but results in inefficient use of the hardware at run time (e.g. as the coefficient buffer will be under-utilised except in the rare situation that it was not possible to compress the coefficients). The output of this mapping method (i.e. the results of the mapping method) comprises data that defines how the coefficients are divided into passes, e.g. in terms of the number of passes or the number of coefficients or filters per pass. This method results in a particularly inefficient implementation where the coefficients are sparse (i.e. they comprise many more zeros than ones) because the compression ratio that can be achieved for sparse coefficients is generally higher than for non-sparse coefficients (i.e. sparse coefficients are more compressible). The coefficients may be trained, such that their distribution is Gaussian-like or Laplacian-like, which increases the compression ratio that can be achieved (e.g. a compression ratio of around 50% may be achieved).

Figure 2:
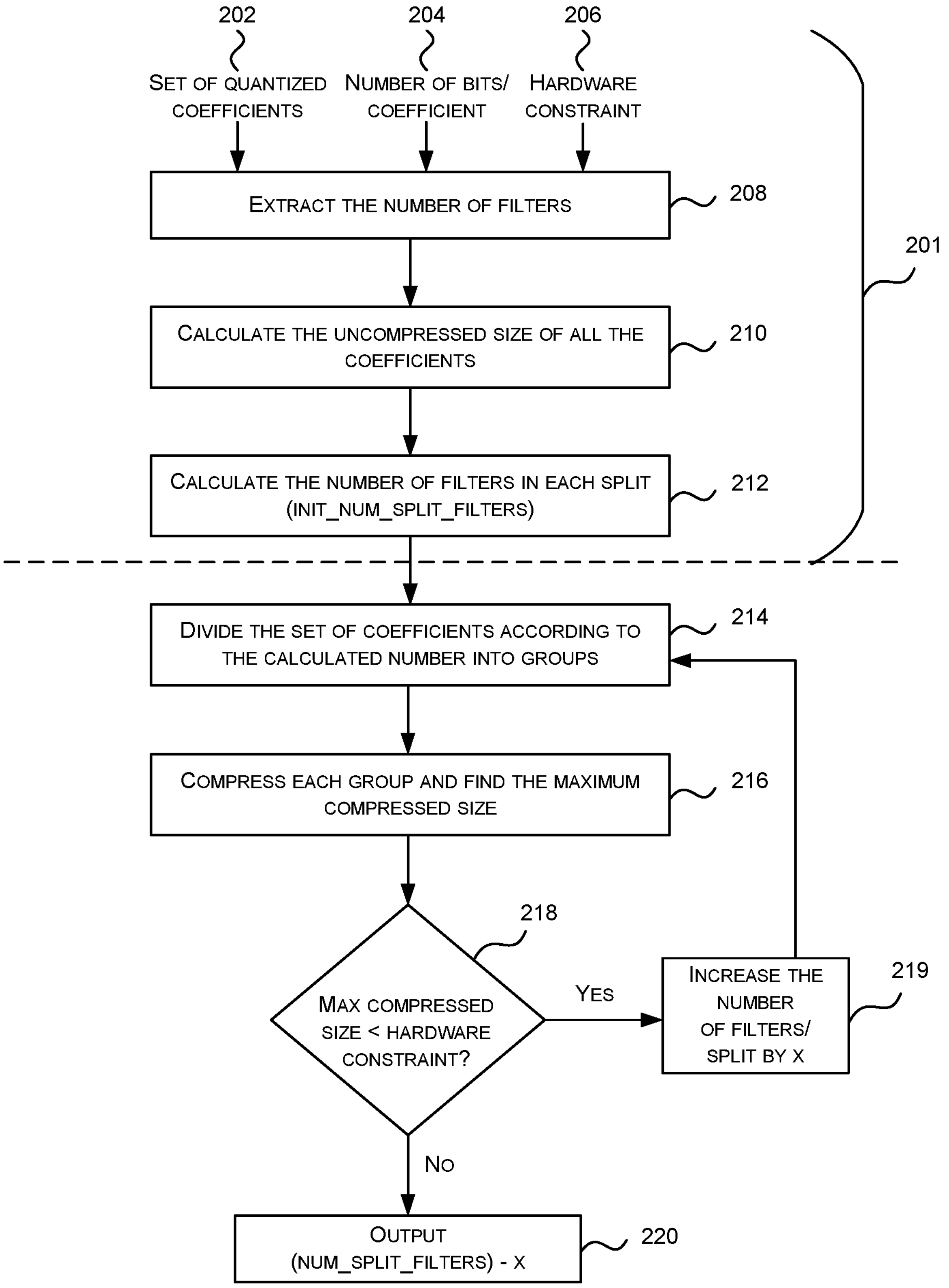
FIG. 2 is a flow diagram of example methods of mapping a NN onto hardware.

The first part 201 of the flow diagram in FIG. 2 shows an example implementation of this method in which the splitting of coefficients is performed at the level of a filter (e.g. such that the smallest split is a single filter). This method may also be used where the splitting is performed in a different way (e.g. per compression block or where p-splits are used) and so reference to number of filters in the following description is by way of example only (e.g. it could alternatively refer to the number of blocks or to the number filters multiplied by the number of p-splits where p-splits are used).

The method takes as input the set of coefficients 202 and the hardware constraint 206 (e.g. the tightest hardware constraint where there are multiple hardware constraints which affect the reading in of the coefficients into the NNA), which may, for example, be the size of the coefficient buffer, cbuf_size. Where the coefficients are quantized, the method may also take as input the size of each quantized coefficient 204 (e.g. in terms of the number of bits per quantized coefficient). The method comprises calculating the number of filters, num_filters (block 208), e.g. by dividing the number of quantized coefficients by the filter size, calculating the uncompressed size of all the coefficients, uncompressed_size_w_q (block 210) and calculating the number of filters in each split by dividing the hardware coefficient (e.g. cbuf_size) by the average uncompressed size of the coefficients for a filter (block 212). This number, ink_num_split_filters, as calculated in block 212, represents an upper bound of the number of filters in each split and may be calculated as follows (equation 1):

$$\text{init\_num\_split\_filters} = \min\left(\left\lfloor \frac{\text{num\_filters} \times \text{cbuf\_size}}{\text{uncompressed\_size\_w\_q}} \right\rfloor, \text{num\_filters}\right)$$

The output of the method 201 may be the number of filters in each split, ink_num_split_filters, or the number of passes (which is given by num_filters divided by ink_num_split_filters). It will be appreciated that the value of ink_num_split_filters may not divide exactly into num_filters and so all but one split may comprise a number of filters given by ink_num_split_filters whilst there may be one split with fewer filters than this.

The efficiency of this example method may be improved, as shown in the second part of FIG. 2. The additional method steps comprise taking the results (e.g. the number of filters per pass, ink_num_split_filters, or the number of passes) from the analysis based on the uncompressed size 201 and dividing up the set of coefficients into groups, one group for each pass, such that each set comprises the coefficients for the calculated number of filters, (block 214), i.e. initially, each group comprises a number of filters given by ink_num_split_filters. Each group of coefficients is independently compressed (e.g. using the compression method described in GB 2579399) and the largest compressed size of any of the groups of coefficients is identified (block 216). This maximum compressed group size is then compared to the tightest hardware constraint (block 218), e.g. the constraint buffer size, cbuf_size, if that is smaller than any bandwidth constraint. If the maximum compressed group size does not exceed (and hence satisfies) the hardware constraint (Yes' in block 218), e.g. it is smaller than the coefficient buffer size, then the number of filters in each pass, num_split_filters, is increased by a value x (block 219) and the method is repeated until the maximum compressed group size does not satisfy the hardware constraint. In an example, the increase, in block 219, may increase the number of filters in each pass by one (x=1). In another example, the number of filters in each pass may be increased in each iteration of the method by a larger amount (e.g. x=2). Selecting a larger value of x results in less granularity of the final result (which may reduce the resultant efficiency of hardware use at run time) but the method will terminate more quickly.

In each subsequent iteration, having increased the number of filters in each pass (in block 219), the input set of coefficients 202 is divided into new groups using that new number of filters per pass (in block 214) and the new groups of coefficients are compressed (in block 216). The new maximum compressed size for any group of filters is then compared to the hardware constraint (in block 218).

For the initial iteration, using num_split_filters=ink_num_split_filters, the maximum compressed group size will always satisfy the constraint (Yes' in block 218) so the method of FIG. 2 may be further optimized by omitting this first iteration and starting, in block 214, with num_split_filters=ink_num_split_filters+x, where x>0. In an example x=1 and in another example x may be set to a value that reduces the overall number of passes by one.

Once the maximum group size does not satisfy the hardware constraint (No' in block 218), the results from the previous iteration, num_split_filters−x, is output (block 220). Again, the value of num_split_filters−x may not divide exactly into num_filters and so all but one split may comprise a number of filters given by num_split_filters−x whilst there may be one split with fewer filters than this.

It will be appreciated that instead of outputting the result as a number of filters, it may instead be output in the form of the corresponding number of coefficients per pass or number of passes.

Whilst the additional method steps in the second part of FIG. 2 (blocks 214-220) increase the efficiency of the use of the hardware at run time, the mapping time is significantly increased.

Described herein is an improved method of mapping a NN onto hardware (such as the hardware shown in FIG. 1) that provides a faster mapping time compared to both the use of just the uncompressed sizes (e.g. as in the first part 201 of FIG. 2) and the modified method described above (e.g. using all of FIG. 2) and also improves the hardware efficiency at run time compared to where the splits are determined based only on the uncompressed sizes. As described in more detail below, the improved method uses a binary tree to reduce the number of computations performed to calculate the compressed sizes of collections of coefficients. The tree may be traversed from the top down, the bottom up, or any combination thereof (e.g. the method may start at the top of the tree, jump down a few levels and then move up/down within the tree based on calculated compressed sizes) and the method may start at any depth within the tree. Furthermore, exploration of the binary tree may be depth-first or breadth-first. The resulting binary tree may be a balanced binary tree (i.e. where all branches terminate at the same depth) or an unbalanced binary tree (i.e. where at least some branches terminate at different depths from other branches in the tree). Whether the tree is balanced or unbalanced may depend upon the compression operation, e.g. how uniform the compression is.

Figure 3A:
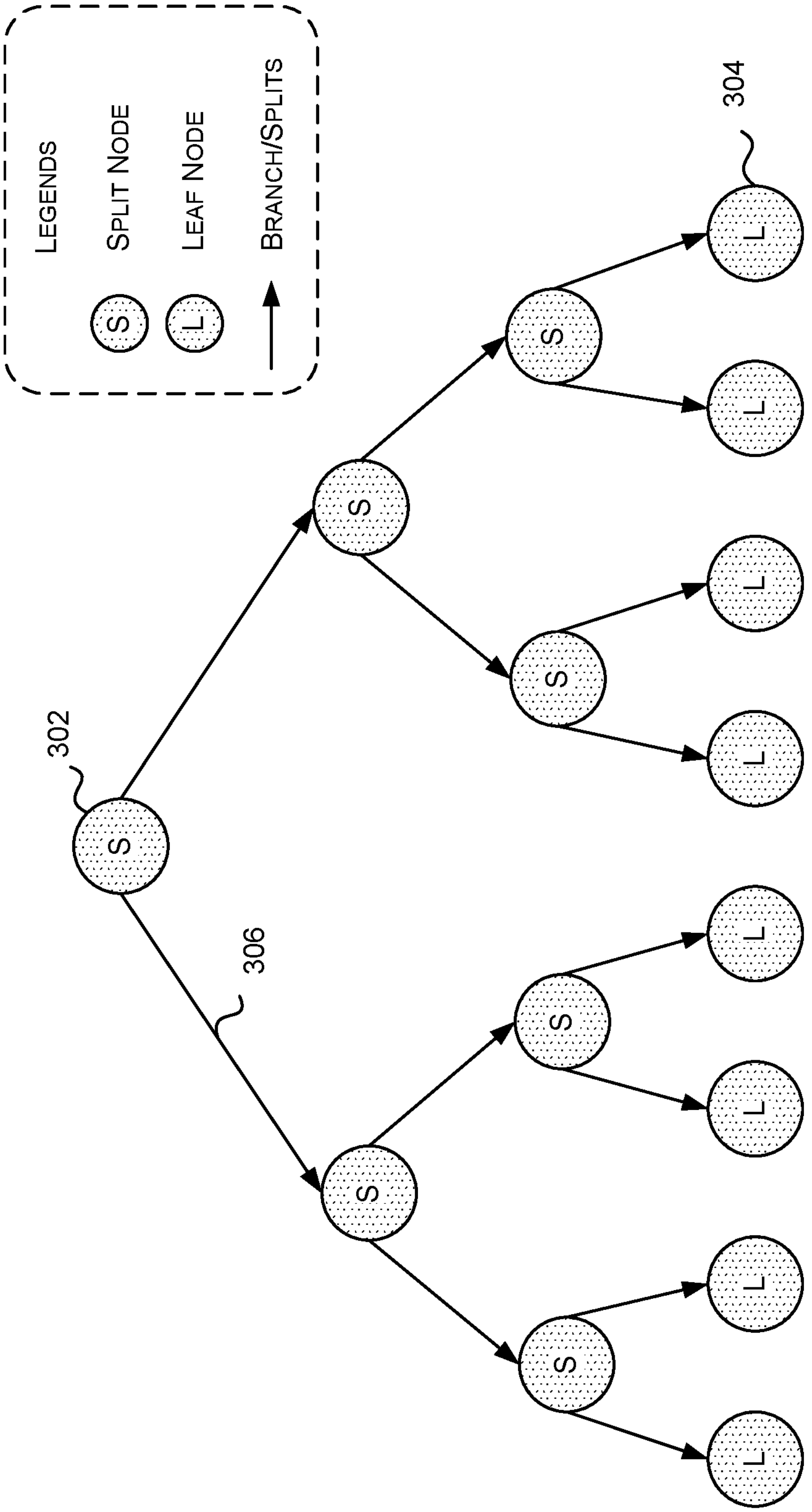
FIG. 3A is a schematic diagram of a balanced binary tree.
Figure 3B:
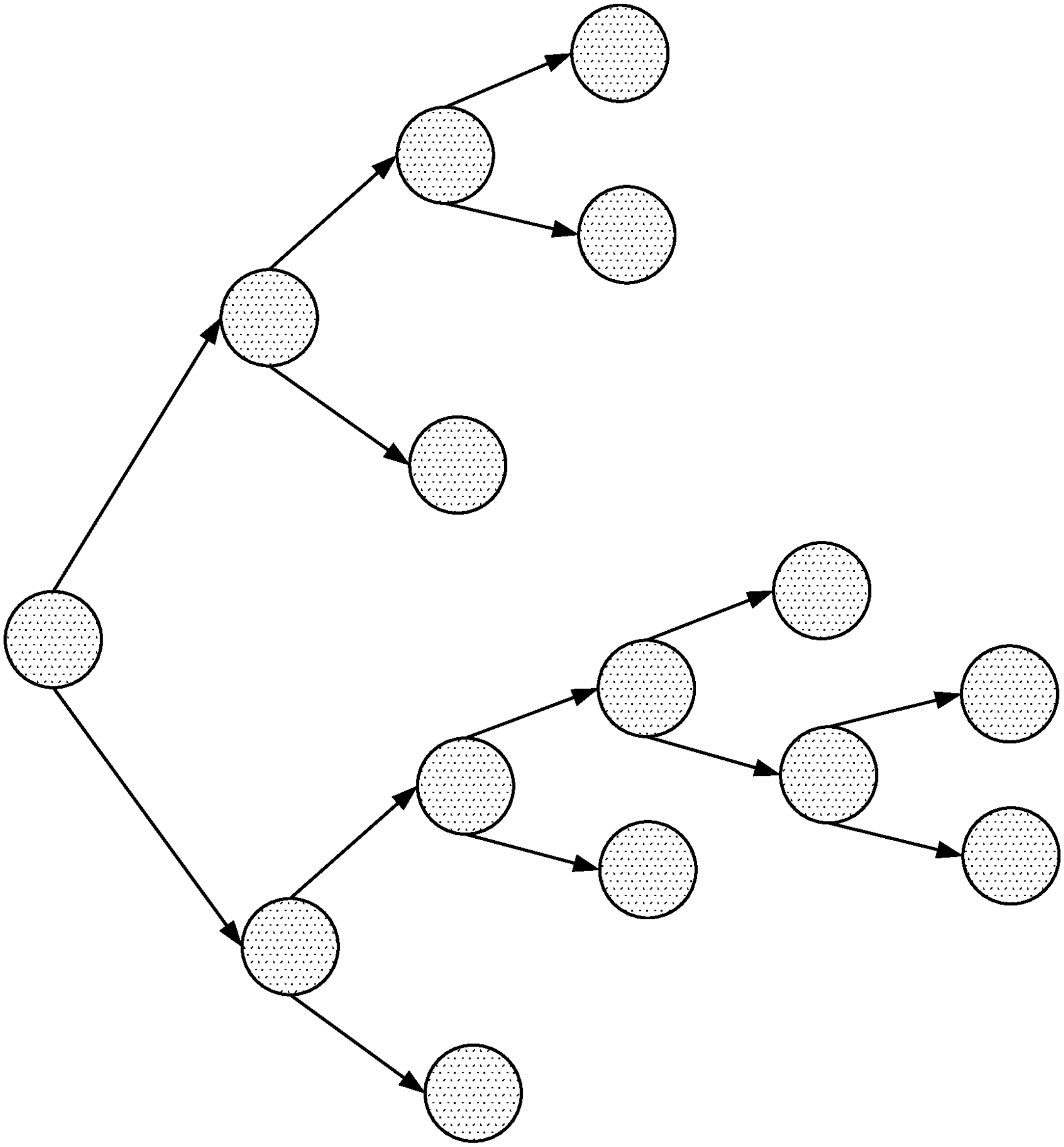
FIG. 3B is a schematic diagram of an unbalanced binary tree.

A binary tree is a tree-like data structure which has binary (i.e. two) splits at each branch and an example of a binary tree is shown in FIG. 3A. The tree consists of two types of nodes: split nodes 302 and leaf nodes 304. Split nodes 302 are responsible for splitting and passing data to branches 306, whereas leaf nodes 304 terminate branches and may contain information about the data reaching them (e.g. recording the size of split reaching a leaf node). The position of a node (split or leaf) can be identified in terms of its depth, with the single split node at the top of the tree being of depth 0, the two split nodes at the level beneath that single split node being of depth 1, etc. The binary tree shown in FIG. 3A is a balanced binary tree, i.e. where all branches reach the same final depth. FIG. 3B shows an unbalanced binary tree in which branches may reach different final depths. In a balanced binary tree the number of splits (i.e. the number of split nodes 302) in each depth is given by (equation 2):

num_of_splits=2 depth

In an unbalanced tree, equation 2 gives the maximum number of splits at any depth. With the binary trees in the orientation shown in FIGS. 3A and 3B, a small depth value indicates a node near the top of the tree whereas a large depth value indicates a node lower down in the tree. It will be appreciated that the binary trees may alternatively be drawn in other orientations, for example such that the leaf nodes are at the top or on the left or right.

The improved method of mapping a NN onto hardware described herein comprises determining a starting depth within the tree (which may, for example, be the first split level where depth=1 or the bottom level or any depth in between) and dividing the set of coefficients into groups one for each split at the starting depth (e.g. where the number of splits may be determined using equation 2). It will be appreciated that if the starting depth is depth=0, then the all the coefficients are considered as a single group num_of_splits=$2^0$=1). Each group of coefficients are then compressed to determine a compressed size for each group (which may also be referred to as a 'split'). At least the largest of the compressed sizes of all the splits is then compared to the hardware constraint(s) (e.g. to the tightest hardware constraint) and the tree is traversed either downwards (such that the current depth increases compared to the starting depth) or upwards (such that the current depth decreases compared to the starting depth) based on the result of that comparison. At least one further iteration is performed (splitting the constraints into groups based on the current depth, determining the new compressed group sizes, and comparing at least the maximum compressed size to the hardware constraint) before data defining the coefficient groups is output.

The data defining the coefficient groups that is output by the improved method described herein splits the layer of the NN into a plurality of passes that are tailored to the specific hardware on which the NN will be executed, with each pass corresponding to a coefficient group. Having output the data defining the coefficient groups, the layer of the NN may be executed on the specific hardware by executing the passes defined by the coefficient groups. As described above, by using the improved method of mapping described herein, not only is the mapping performed more quickly, but also the efficiency of the specific hardware when executing the NN is improved.

The improved method of mapping a NN onto hardware that is described herein may be used for a convolutional NN layer (where each coefficient is a weight that belongs to a convolutional filter) or for other types of NN layers where coefficients are combined with input data (e.g. fully connected layers, deconvolution layers, etc.). Any reference to a convolutional NN layer is by way of example only.

The improved method of mapping a NN onto hardware that is described herein may be used in combination with the compression method described in GB patent 2579399 or any other block-based compression method where increasing the number of data items in a group of data items that are compressed together cannot result in an increase in the compression ratio that is achieved. The method is particularly beneficial where the compression method used does not result in a fixed compression ratio but instead where different groups of data may be compressed by different amounts dependent upon the values of the data items within the group. This is because the compressed size cannot be determined based on the uncompressed size alone (i.e. it cannot be determined without actually performing the compression).

Figure 4:
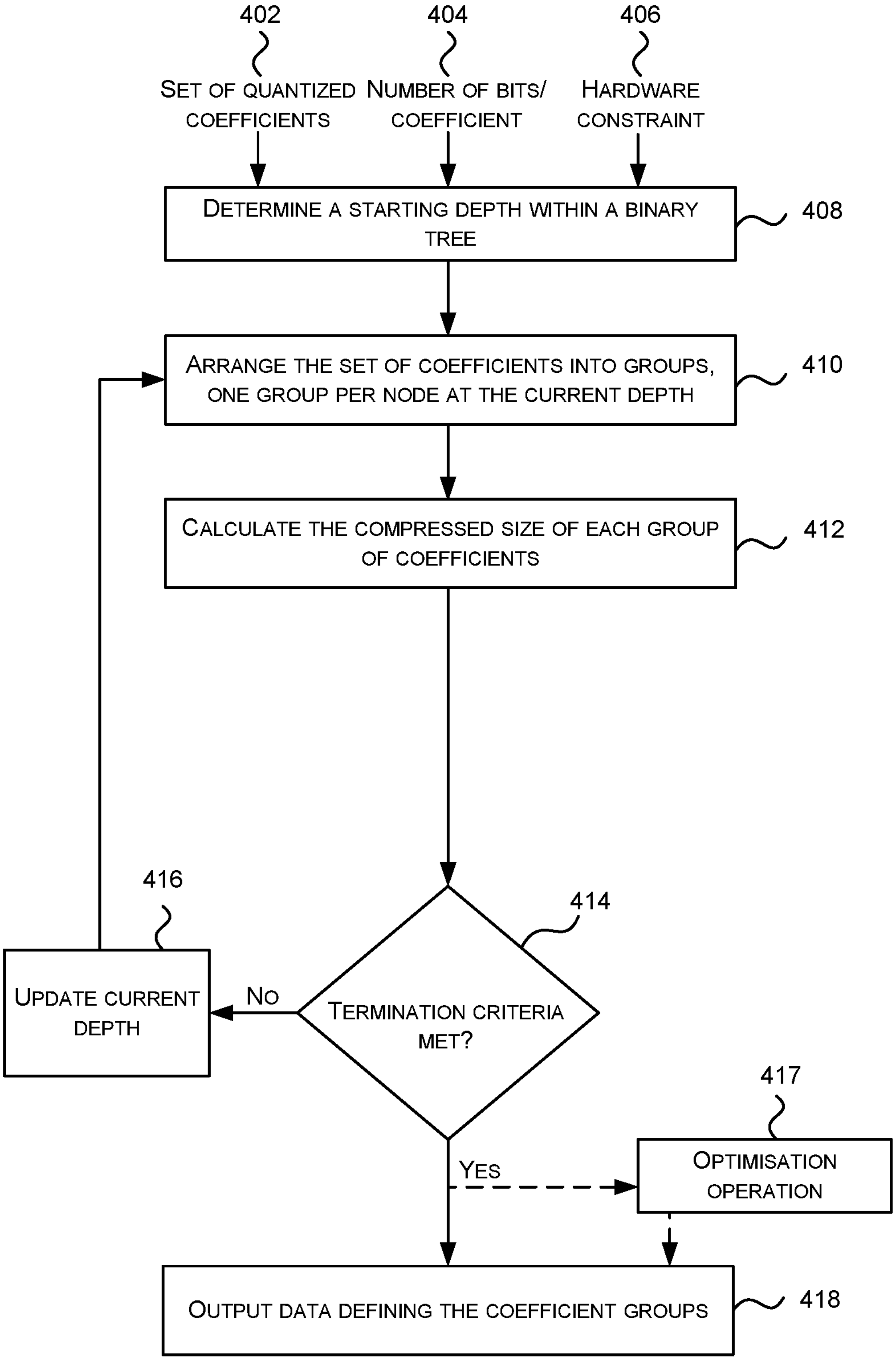
FIG. 4 is a flow diagram of an improved method of mapping a NN onto hardware.

A first example of the improved method of mapping a NN onto hardware is shown in FIG. 4. In the example shown in FIG. 4, the method takes as input the set of coefficients 402 (where these may be quantized coefficients) and the hardware constraint 406, which may, for example, be the size of the coefficient buffer, cbuf_size. Whilst FIG. 4 refers to a single hardware constraint it will be appreciated that there may be more than one hardware constraint that is received as input. Where more than one hardware constraint is input, the later comparison operation may use the tightest of those input constraints or may use some or all of the input constraints. In some examples, where the coefficients are quantized, the method may also take as input the size of each quantized coefficient 404 (e.g. in terms of the number of bits per quantized coefficient). Where this size is not input but is used as part of a subsequent operation, the size may be determined from analysis of the set of coefficients 402.

As shown in FIG. 4, the method starts by determining a starting depth within the binary tree (block 408). This starting depth may, for example, be the level in the binary tree at which the first split occurs (depth=1), the bottom of the tree (e.g. as determined based using the uncompressed size or the smallest possible split) or at any point in between. For the bottom level of the binary tree, the depth may, for example, be given by (equation 3):

$$\text{bottom\_depth} = \log_2\left\lfloor \frac{\text{cbuf\_size}}{\text{uncompressed\_size\_w\_q}} \right\rfloor$$

where cbuf_size is the tightest hardware constraint and which may be the coefficient buffer size or another constraint (e.g. a bandwidth constraint). In other examples the bottom level may be selected such that each leaf node comprises the smallest split of coefficients. The smallest split of coefficients may be determined based on characteristics of the NN layer, e.g. the coefficients that form a single filter in a convolutional NN layer unless p-splits are used. Where p-splits are used, the smallest possible split may be the coefficients that form a single filter from those channels in the p-split. As noted above, where a block passed compression method is used, the coefficients in the smallest possible split may be padded with zeros so that it is a multiple of the block size. For example, where the smallest split comprises the coefficients for a single filter, the depth may, for example, be given by (equation 4):

$$\text{bottom\_depth}=\log_2\lfloor \text{num\_filters} \rfloor$$

It will be appreciated that where p-splits are used, a filter may be further split into multiple groups according to the p-split and in which case equation 4 is modified to take into account the number of channels in each p-split as shown below:

$$\text{bottom\_depth}=\log_2\lfloor \text{num\_filters}\times\text{num\_}p\text{splits} \rfloor$$

where num_psplits is the number of p-splits. The following description uses equation 4, but it will be appreciated that the modified version of equation 4 may alternatively be used. Similarly, where the smallest split is a single block of coefficients according to the block-based compression scheme, the depth may, for example, be given by (equation 5):

$$\text{bottom\_depth} = \log_2\left\lfloor \frac{\text{num\_filters}\times\text{filter\_size}}{\text{block\_size}} \right\rfloor$$

where block_size is the number of coefficients in a single block of coefficients according to the compression scheme and filter_size is the number of coefficients per filter. Where padding is used, the number of coefficients per filter may be increased so that the number of input channels to a multiple of the block size.

The selection of the starting depth (in block 408) determines whether the binary tree is traversed in a downwards direction (i.e. such that the depth increases) or an upwards direction (i.e. such that the depth decreases). For example, if the starting depth is 0 or 1, the binary tree is traversed in a downwards direction and if the starting depth is at the bottom of the tree, the binary tree is traversed in an upwards direction. For intermediate starting depths, the binary tree may be traversed either downwards or upwards and this may be dependent upon the way that the starting depth is calculated (e.g. whether the starting depth is calculated to be conservatively small, in which case the traversal is downwards, or conservatively large, in which case the traversal is upwards).

Having determined the starting depth (in block 408), the input set of coefficients is divided into groups (block 410), with one group for each split node in the determined starting depth (e.g. as calculated using equation 2) and in this initial iteration each group of coefficients is compressed in order to determine the compressed size of each group (block 412). These compressed group sizes are then used to determine whether termination criteria are met (block 414). These termination criteria, which are described in more detail below, differ depending upon whether the binary tree is being traversed downwards or upwards, and involve a comparison of at least one compressed group size to the hardware constraint(s). The termination criteria also ensure that at least two iterations of the method are performed.

In the first iteration, the termination criteria are never met and so the current depth, which is initially equal to the starting depth, is updated (block 416). This updating of the current depth (in block 416) may be performed in a number of different ways, e.g. dependent upon whether the binary tree is restricted to being a balanced binary tree or whether the binary tree may be an unbalanced tree and this is described in more detail below. The updating (in block 416) also depends on the value of the starting depth and/or how the starting depth was determined and as a result whether the binary tree is being traversed in a downwards direction or an upwards direction. If the tree is being traversed downwards, the update increases the current depth, whereas if the binary tree is being traversed upwards, the update (in block 416) reduces the current depth. In an example, the update may increase or decrease the current depth by a value x and in various examples x=1 and in other examples x>1.

Having updated the current depth (in block 416), at least a second iteration (blocks 410-414) is performed. If the binary tree is being traversed in a downwards direction and x=1, then in each iteration, the groups of coefficients are split in two (in block 410) and then the new groups are compressed to determine the compressed group sizes (in block 412). If, however, the binary tree is being traversed in an upwards direction (and x=1), then in each iteration after the first iteration, groups of coefficients are combined (because the number of splits halves as the depth reduces by one) and the new compressed group size for any newly formed group can be determined by summing the compressed group sizes of the two groups from the previous iteration that have been combined to form the new group. If x>1, then x−1 layers in the binary tree are effectively skipped each iteration. As a result for downwards traversal, groups of coefficients are split into 2x groups and for upwards traversal, 2×groups of coefficients are combined together.

The method of FIG. 4 may terminate after two or more iterations when the termination criteria are satisfied (in block 414) and these termination criteria will differ depending upon whether the binary tree is being traversed in a downwards direction or an upwards direction. For a binary tree that is being traversed downwards, the termination criteria may be given by (equations 6A, 6B, 6C):

$$\text{compressed\_group\_size} \leq \text{cbuf\_size}$$

$$\text{current\_depth} \geq \text{starting\_depth} + 1$$

$$\text{current\_depth} \geq 2$$

and the method terminates only if all of these criteria (i.e. all of equations 6A, 6B and 6C) are satisfied. For a binary tree that is being traversed upwards, the termination criteria may be given by (equations 7A, 7B):

$$\text{compressed\_group\_size} \geq \text{cbuf\_size}$$

$$\text{current\_depth} \leq \text{starting\_depth} - 1$$

and similarly, the method terminates only if all of these criteria (i.e. both equations 7A and 7B) are satisfied. Of these criteria, only the first one (equations 6A and 7A) involve a comparison to the tightest hardware constraint and the second (equations 6B and 7B) ensures that at least two iterations of the method of FIG. 4 are performed. The third one for downwards traversal (equation 6C) ensures that at least the input set of coefficients is split at least twice and may be used if there is no restriction that stops the starting depth being the top of the tree (e.g. starting_depth=0).

For a balanced tree, the termination criteria may relate to the entire tree (because all branches reach the same final depth), whereas for an unbalanced tree, the termination criteria are separately applied to each branch, with different branches terminating at different depths. In some examples for a balanced tree, the termination criteria may also be separately applied to each branch as this reduces the overall computational effort by pruning the tree; however in such implementations the maximum depth reached by any of the branches is used to generate the output data.

Once the method terminates ('Yes' in block 414), data defining the coefficient groups may be output (block 418) based on the current depth at the time of termination or further optimizations may first be performed (block 417), as described below with reference to FIGS. 8-9. The data that is output may define the coefficient groups in a number of different ways and this will depend, in part, on whether a balanced or unbalanced tree is used. For a balanced tree, the output data may define the number of splits or the number of coefficients (or filters or blocks) per split. For an unbalanced tree, data is output that defines each individual split because the splits will not all be the same size and may define the number of coefficients (or filters or blocks) in each individual split. By defining the coefficient groups, the data output (in block 418) specifies the number of hardware passes and how the coefficients are divided into these hardware passes. Having output the data that defines the hardware passes (in block 418), the corresponding passes may be executed on the hardware (i.e. on the hardware with the hardware constraint 406) in order to execute the layer of the NN.

Where no additional optimizations are performed (block 417 is omitted) and the data defining the coefficient groups is output (in block 418), this is also dependent upon the direction of traversal of the binary tree. If the tree is being traversed downwards, then the output depth, output_depth, is equal to current_depth and if the tree is being traversed upwards, then the output depth is given by current_depth+x. In both cases, the number of splits can be determined from the output depth using equation 2 and the number of filters per split can be determined using equation 8 (see below). For an unbalanced depth there will be separate values of current_depth and hence output depth for each branch or group of branches, where a group of branches all terminate at the same depth. The number of filters in each split may be determined using (equation 8):

$$\text{num\_split\_filters} = \frac{\text{num\_filters}}{2^{output\_depth}}$$

As described above, where the method outputs a single size of coefficient group (in block 418), this value may not divide exactly into num_filters and so all but one split may comprise the same number of filters as specified by the output data (from block 418) whilst there may be one split with fewer filters than this.

Figure 5:
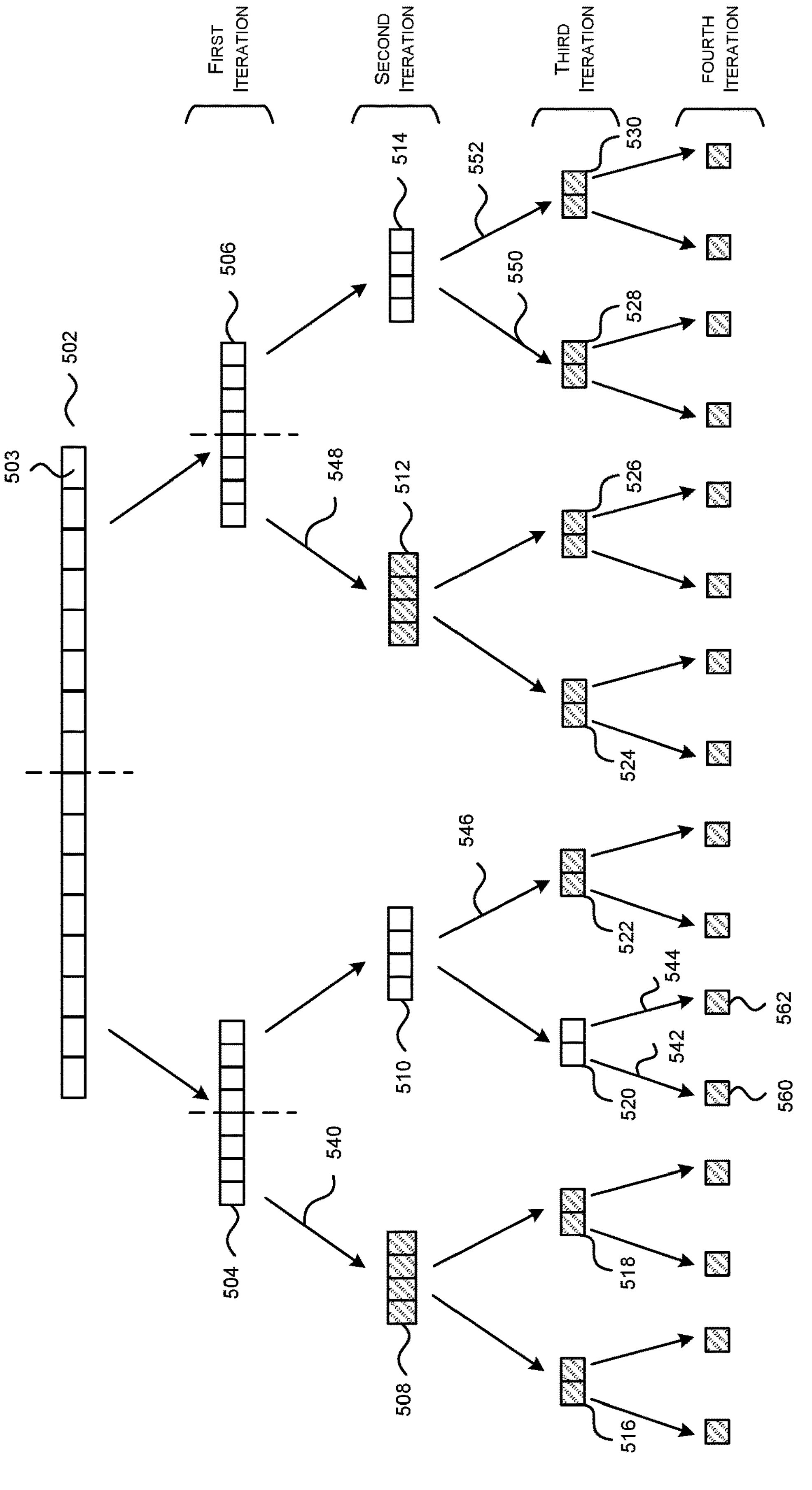
FIG. 5 shows a schematic diagram of the splitting of a set of coefficients as a binary tree is traversed downwards using a breadth-first scheme.

In examples where the binary tree is traversed in a downwards direction and x=1, this traversal can be described with reference to FIG. 5. FIG. 5 shows a schematic diagram of the splitting of a set of coefficients 502 as the tree is traversed downwards. Each small square block 503 in FIG. 5 represents the smallest possible split which, as described above, may correspond to the coefficients of a single filter or the coefficients forming a block according to the block-based compression scheme used. It will be appreciated that in practice there will be very many more coefficients than are shown in FIG. 5. Starting where the first split occurs at depth=1, the set of coefficients 502 is split into two groups, 504, 506 (in block 410) and each group is compressed (in block 412). As this is the first iteration, the termination criteria are never met (No' in block 414) and this results in the depth being increased by one (in block 416), such that current_depth=2.

In the second iteration, each of the groups from the previous iteration are split in two (in block 410) to form four groups 508-514 and then each of the four groups are compressed (in block 412) to calculate four compressed group sizes. At least the largest, and in many cases all, of the compressed group sizes are then compared to the hardware constraint to determine whether the termination criteria are met (in block 414). Referring back to equations 6A-6C, this is the only relevant termination criterion after the first iteration and where the current_depth is equal to two (which will be the case as long as the starting depth was not the very top of the binary tree where depth=0). If any compressed group size exceeds the hardware constraint, the termination criteria are not satisfied (No' in block 414) and the binary tree is traversed further down, i.e. current_depth is increased by one (in block 416), for at least that branch.

In the example shown in FIG. 5, the result of the comparison to the hardware constraint (in block 414) is shown by way of shading. A group that exceeds the hardware constraint is shown unshaded and a group that satisfies the hardware constraint is shown as shaded. In the example shown, of the four groups formed in the second iteration, two satisfy the hardware constraint and two do not. As a result, the depth is increased by one, such that current_depth=3.

In the third iteration, each of the groups from the previous iteration are split in two (in block 410) to form eight groups 516-530 and then each of the eight groups are compressed (in block 412) to calculate eight compressed group sizes. As before, at least the largest, and in many cases all, of the compressed group sizes are then compared to the hardware constraint (in block 414), although any groups that are derived from groups that did not exceed the constraint in the previous iteration (e.g. that are derived from groups that are shown as shaded in FIG. 5) may be excluded from the calculation and comparison operations (blocks 412 and 414) or from only the comparison operation (block 414). In the example shown, there is one compressed group size (the compressed group size of group 520) that exceeds the hardware constraint (No' in block 414) and so the binary tree is traversed further down, such that current_depth=4 (as updated in block 416).

In the fourth iteration, each of the groups from the previous iteration are split in two (in block 410) to form sixteen groups and then each of the sixteen groups are compressed (in block 412) to calculate sixteen compressed group sizes. At least the largest, and in many cases all, of the compressed group sizes are then compared to the hardware constraint (in block 414). In this example, all of the compressed group sizes satisfy the hardware constraint and so the method terminates (Yes' in block 414) and data defining the coefficient groups at the output depth, where the output depth is given by current_depth and in this example is equal to four, is output (in block 418).

The binary tree in FIG. 5 is a balanced tree such that each of the output coefficient groups comprises the same number of coefficients as defined by the output depth and so the data output (in block 418) may, for example, be the output depth (output_depth=4) or the number of minimum sized splits 503 in each group and hence in each pass (e.g. num_split_filters=1). The number of minimum sized splits 503 in each group may be determined from the output depth using equation 8.

Even in the example of FIG. 5 with only a small number of coefficients, it can be seen that the number of compression operations that are performed as part of the method of FIG. 4 for a balanced binary tree can be reduced by terminating processing of branches once the termination criteria (assessed in block 414) determine that the compressed group size for a particular branch satisfies the hardware constraint (equation 6A, assuming equations 6B and 6C are also met) and only progressing with those branches where the constraint is not satisfied. If instead an unbalanced binary tree may be used, not only are branches terminated in this way but when outputting the data defining the coefficient groups (in block 418), the number of coefficients per group is not always the same and is dependent upon the depth at which each branch terminated. In the example of FIG. 5, the first and fifth branches 540, 548 could be terminated at a depth of two, the second and third branches 542, 544 could be terminated at a depth of four and the fourth, sixth and seventh branches 546, 550, 552 could be terminated at a depth of three. The data output (in block 418) may, for example, be the output depth for each group and hence pass (output_depth={2,4,4,3,2,3,3}) or the number of minimum sized splits 503 in each group and hence in each pass (e.g. num_split_filters={4,1,1,2,4,2,2}).

Figure 6:
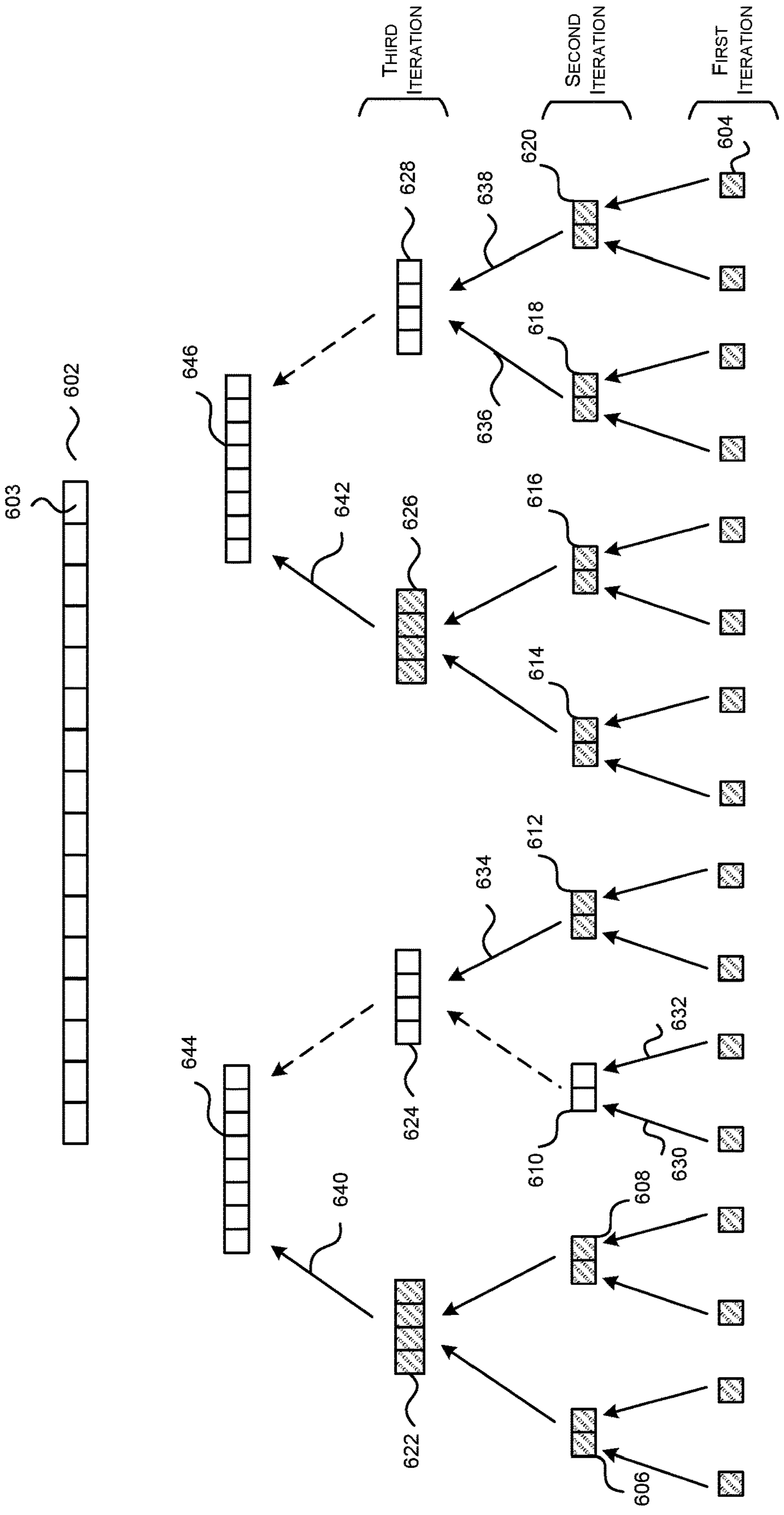
FIG. 6 shows a schematic diagram of the splitting of a set of coefficients as a binary tree is traversed upwards.

In examples where the binary tree is traversed in an upwards direction and x=1, this traversal can be described with reference to FIG. 6. FIG. 6 shows a schematic diagram of the splitting of a set of coefficients 602 as the tree is traversed upwards. Each small square block 603 in FIG. 6 represents the smallest possible split which, as described above, may correspond to the coefficients of a single filter or the coefficients forming a block according to the block-based compression scheme used. It will be appreciated that in practice there will be very many more coefficients than are shown in FIG. 6.

Starting at the bottom of the tree, at a depth, bottom_depth, given by equation 4 or 5 above (bottom_depth=4), the set of coefficients 602 is split into its smallest splits, resulting in 16 groups 604 (in block 410) and each group is compressed (in block 412). As this is the first iteration, the termination criteria (in particular equation 7B) are never met (No' in block 414) and as a result the depth is decreased by one (in block 416) as the binary tree is being traversed upwards. This means that current_depth= bottom_depth+1=3.

In the second iteration, pairs of the groups from the previous iteration are joined together (in block 410) to form eight groups 606-620 and then the compressed size of each of the eight groups is calculated by summing the compressed sizes of the constituent groups as calculated in the previous iteration (in block 412). Where the binary tree is traversed upwards, compression only need to be performed in the first iteration and all subsequent compressed sizes can be calculated (in block 412) using addition operations. At least the largest, and in many cases all, of the compressed group sizes are then compared to the hardware constraint to determine whether the termination criteria are met (in block 414). For the second and subsequent iterations, this is the only relevant termination criterion (equation 7A) because the other termination criterion (equation 7B) is always satisfied.

In the example shown in FIG. 6, the result of the comparison to the hardware constraint (in block 414) is shown by way of shading. A group that exceeds the hardware constraint is shown unshaded and a group that satisfies the hardware constraint is shown as shaded. In the example shown, of the eight groups formed in the second iteration, one group (group 610) does not satisfy the hardware constraint and the remaining seven groups (groups 606, 608 and 612-620) satisfy the constraint.

For a balanced tree and traversal upwards, as soon as one compressed group size does not satisfy the hardware constraint, the method terminates (Yes' in block 414). Data defining the coefficient groups at the output depth is then output (in block 418), where, for an upwards traversal, the output depth is given by current_depth+1 and in this example is equal to four. It can be seen that whilst the method of calculating the output depth is different for upwards and downwards traversal, the end result (output_depth=4) is the same. The data output (in block 418) may, for example, be the output depth (output_depth=4) or the number of minimum sized splits 503 in each group and hence in each pass (e.g. num_split_filters=1).

For an unbalanced tree and traversal upwards the termination criteria may be applied on a per-branch basis so that instead of terminating completely after the second iteration, the method only terminates for those branches forming the group 610 that did not satisfy the hardware constraint. For the remaining branches, the binary tree is traversed further upwards, i.e. current_depth is decreased by one (in block 416).

In the third iteration, for each non-terminated branch, a pair of groups from the previous iteration are combined (in block 410) to form four groups 622-628. It can be seen that whilst the branches 630, 632 forming group 610 have terminated, group 610 is still used to form one of the four groups 624 in the third iteration. The compressed size of each group is calculated (in block 412) and compared to the hardware constraint (in block 414). As with the second iteration, a branch is terminated (Yes' in block 414) if the group does not satisfy the hardware constraint and so in this example, there are three branches 634-638 that terminate because there are two groups 624, 628 that do not satisfy the hardware constraint.

In the fourth iteration, for each non-terminated branch 640, 642, a pair of groups from the previous iteration are combined (in block 410) to form two groups 644, 646. The compressed size of each group is calculated (in block 412) and compared to the hardware constraint (in block 414). As both groups do not satisfy the hardware constraint, all remaining branches terminate (Yes' in block 414). The data output (in block 418) may, for example, be the output depth for each group and hence pass (output_depth={2,4,4,3,2,3,3}) or the number of minimum sized splits 503 in each group and hence in each pass (e.g. num_split_filters={4,1,1,2,4,2,2}).

Figure 7:
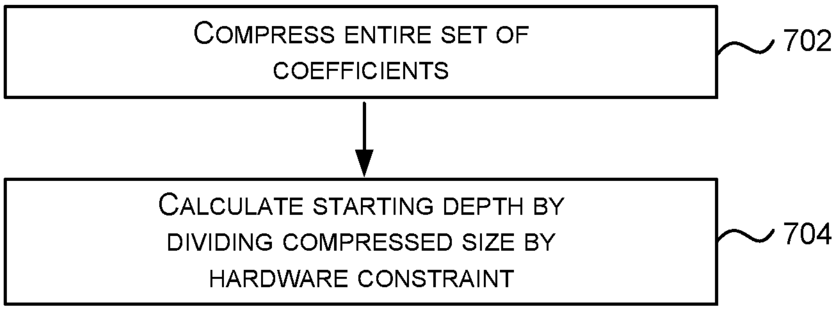
FIG. 7 is a flow diagram of an example method of selecting a starting depth for use in the method of FIG. 4.

The method of FIG. 4 may be speeded up by selecting a starting depth that is neither depth=1 or nor the bottom of the binary tree and this can be seen in the example of FIG. 5. Even in this example with only a small number of coefficients, by starting at a depth of two (starting_depth=2), rather than one, the overall number of iterations, and hence compression operations (in block 412), is reduced. An example method of selecting a starting depth (in block 408) can be described with reference to FIG. 7. The method starts by compressing the entire set of coefficients using the compression method (block 702) and then this compressed size of the entire set is used to calculate the starting depth (block 704). The starting depth is calculated by dividing the compressed size by the hardware constraint to give the number of starting splits and then using equation 2 to determine the depth that comprises that number of splits. Where the binary tree is traversed downwards the result is biased to a smaller value to ensure that the starting depth that is used is not too low (in the orientation of FIGS. 3A and 3B) and where the binary tree is traversed upwards, the result is biased to a larger value so that the starting depth is not too high (in the orientation of FIG. 6). For example, where the binary tree is traversed downwards, the resulting depth may be rounded upwards and then the starting depth selected to be one less than the resulting depth or the resulting depth may be rounded downwards and the starting depth selected to be equal to the resulting depth. For example (equation 9A):

$$\text{starting\_depth} = \max\left(0, \left\lceil \log_2\left(\frac{\text{compressed}_{set_{size}}}{cbuf_{size}}\right)\right\rceil - 1\right)$$

or (equation 9B):

$$\text{starting\_depth} = \max\left(0, \left\lfloor \log_2\left(\frac{\text{compressed}_{set_{size}}}{cbuf_{size}}\right)\right\rfloor\right)$$

It will be appreciated that in all equations herein, the sizes need to be in the same units (e.g. bits or bytes). Similarly, where the binary tree is traversed upwards, the resulting depth may be rounded downwards and then the starting depth selected to be one more than the resulting depth or the resulting depth may be rounded upwards and the starting depth selected to be equal to the resulting depth. For example (equation 10A):

$$\text{starting}_{depth} = \left\lfloor \log_2\left(\frac{\text{compressed}_{set_{size}}}{cbuf_{size}}\right)\right\rfloor + 1$$

or (equation 10B):

$$\text{starting\_depth} = \left\lceil \log_2\left(\frac{\text{compressed}_{set_{size}}}{cbuf_{size}}\right)\right\rceil$$

As described above, once the termination criteria are satisfied (Yes' in block 414), the current depth may be used directly to output data defining the coefficient groups (in block 418) or one or more optimizations may be performed (in block 417).

The method of FIG. 4 may in addition, or alternatively, be speeded up by using a larger value of x, such that x>1. This results in skipping layers in the binary tree and whilst it speeds up the operation of the method, the results are more likely to be less optimum and this may reduce the resultant hardware efficiency at run time.

Figure 8:
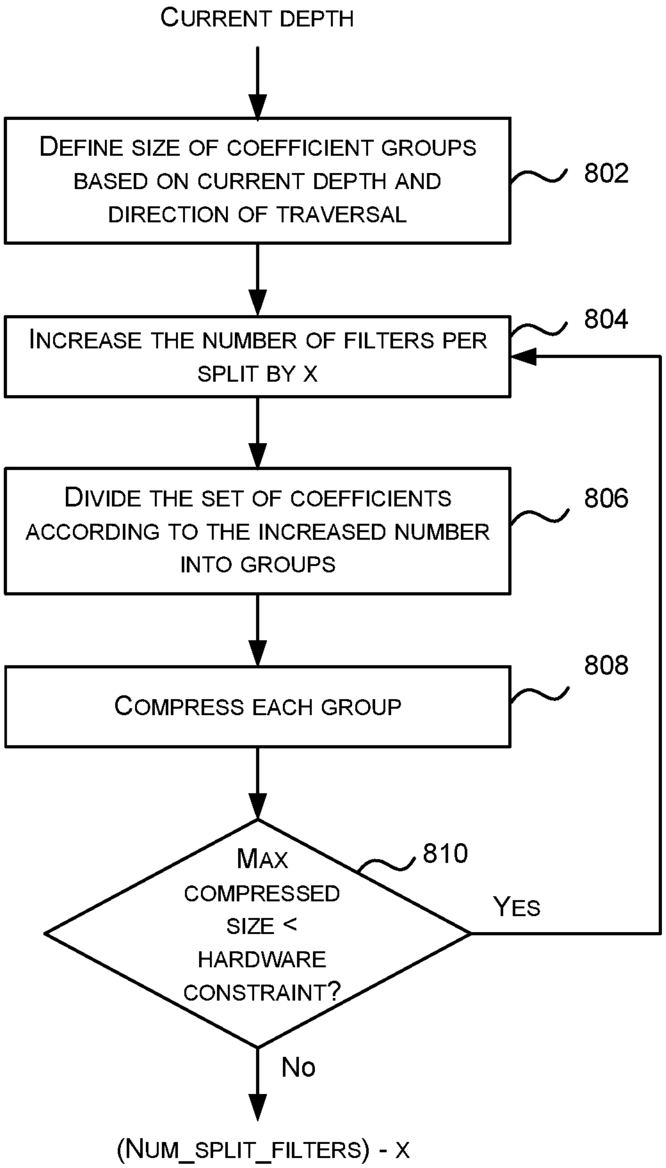
FIG. 8 is a flow diagram of a first optimization that may be used in the method of FIG. 4.

A first example optimization is shown in FIG. 8 which corresponds to the second part of FIG. 2 and which may be used for balanced trees. As shown in FIG. 8, this optimization (in block 417) receives the current_depth value and using this, and the direction of traversal, defines the size of each coefficient group, num_split_filters, (block 802). The size of each coefficient group may be determined (in block 802) by calculating an interim_depth value from the current_depth value using the same technique as described above to calculate the output_depth and then using equation 8. If the tree is being traversed downwards, then the interim_depth is equal to current_depth and if the tree is being traversed upwards, then the interim_depth is given by current_depth+1.

Having determined the size of each group of coefficients, the number of filters per split, num_split_filters, is increased, e.g. by an integer value, x (block 804, which corresponds to block 219 in FIG. 2). The value of x that is used in the optimization may be the same as, or different from, the value of x used in the earlier part of the method of FIG. 4 and in various examples x=1 is used in both situations. It will also be appreciated that as set out above, if the smallest split is not at filter level but compression block level, it is the number of blocks per split that is increased by x (in block 804).

The set of coefficients is then divided into groups of the determined size (block 806, which corresponds to block 214) and each group is compressed to find the maximum compressed size (block 808, which corresponds to block 216). It will be appreciated that there may be one group which is smaller than the defined size (i.e. smaller than the defined number of filters per split as determined in block 804) if the number does not divide exactly into the total number of filters, num_filters. The maximum compressed size is compared to the tightest hardware constraint (block 810, which corresponds to block 218) and if the maximum compressed size is less than the hardware constraint (Yes' in block 810) then the method is repeated (as indicated by the arrow from block 810 to block 804).

If, in this the iteration or a subsequent iteration, the maximum compressed size is found to equal or exceed the tightest hardware constraint (No' in block 810), then the group size from the previous iteration (as given by num_split_filters−x) is output and used to generate the output data defining the coefficient groups (in block 418 of FIG. 4). As described above, for a balanced tree, there may be one split that comprises fewer coefficients than all the rest of the splits because the final data that is output (in block 418) may define a number of filters per split that does not divide exactly into the total number of filters in the layer.

This first optimization results in a finer granularity of splitting than purely powers of two (as in the method of FIG. 4 without any optimizations) but can be performed much more quickly than using the method of FIG. 2.

Figure 9:
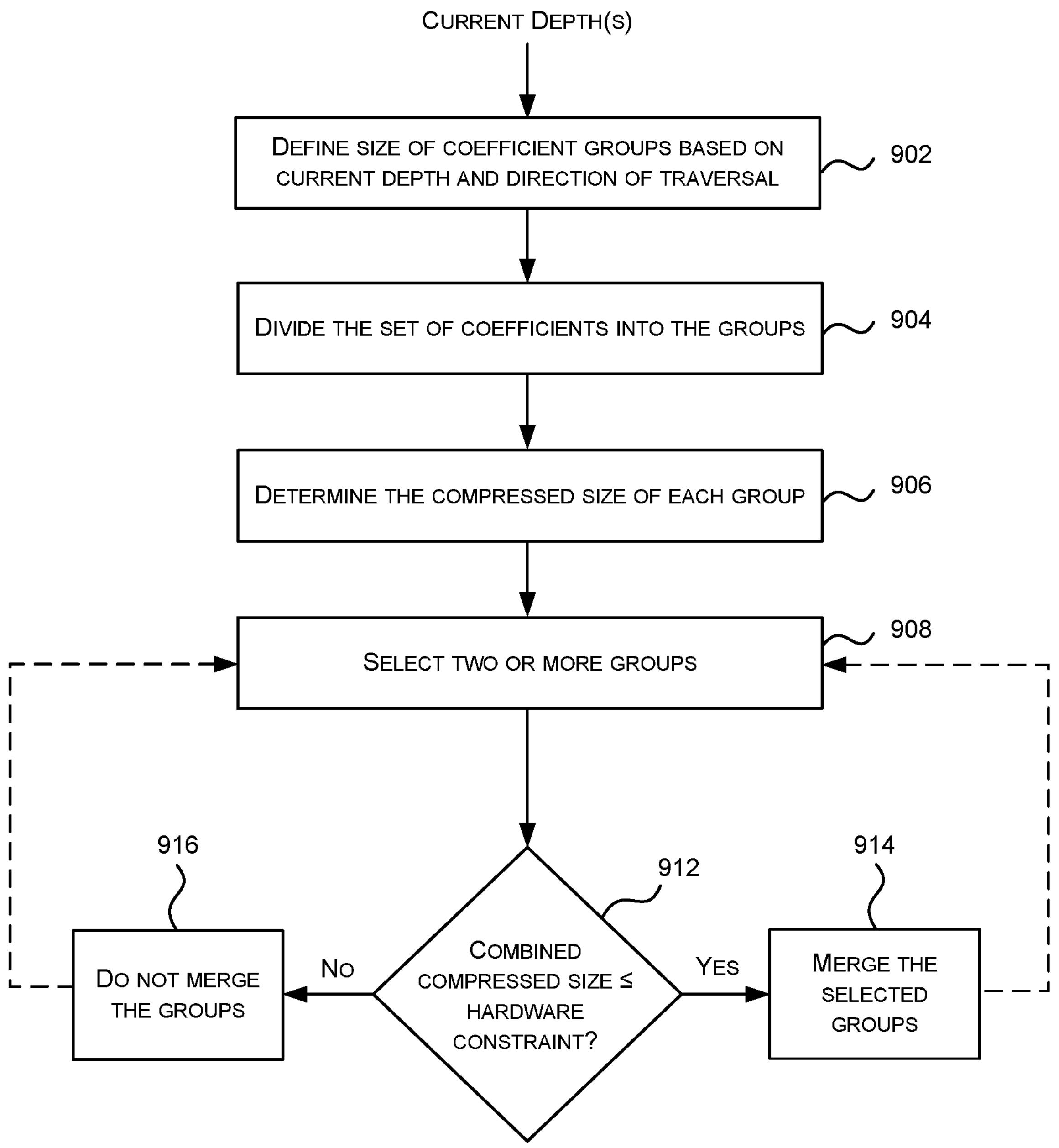
FIG. 9 is a flow diagram of a second optimization that may be used in the method of FIG. 4.

A second example optimization, as shown in FIG. 9, which may be used in combination with the method of FIG. 8 or may be used independently, involves merging of two or more coefficient groups (e.g. merging of those coefficient groups that correspond to leaf nodes of the binary tree, which may be balanced or unbalanced) if the combined compressed size is not larger than the tightest hardware constraint.

As shown in FIG. 9, the optimization method starts in a similar manner to the optimization of FIG. 8 by receiving the current_depth value and using this, and the direction of traversal, to define the size of each coefficient group, num_split_filters, (block 902, which corresponds to block 802 of FIG. 8). As described above, the size of each coefficient group may be determined (in block 902) by calculating an interim_depth value from the current_depth value using the same technique as described above to calculate the output depth and then using equation 8. If the tree is being traversed downwards, then the interim_depth is equal to current_depth and if the tree is being traversed upwards, then the interim_depth is given by current_depth+1.

Having determined the size of each group of coefficients, the set of coefficients is then divided into groups of the determined size (block 904, in a similar manner to block 806 and block 214) and the compressed size of each group is determined (block 906). As the groups are the same size as in an earlier iteration of the method of FIG. 4 (e.g. as calculated in a previous instance of block 412), the compressed size may be available and it may not be necessary to perform any additional compression operations. Two or more of the groups are then selected (block 908) and if their combined compressed size (as determined by summing their individual compressed sizes) does not exceed the tightest hardware constraint (Yes' in block 912), the groups are merged (block 914). If their combined compressed size exceeds the tightest hardware constraint (No' in block 912) then the groups are not merged (block 916). The method may then be repeated by selecting a further two or more groups (in block 908) and comparing the combined compressed size of the newly selected groups to the tightest hardware constraint (in block 912).

The selection of groups as candidates for merging (in block 908) may be based on the structure of the tree, e.g. such that two or more adjacent leaf nodes within the binary tree are selected from left to right (or vice versa) and assessed for merging. The leaf nodes may be selected based on their compressed sizes e.g. such that adjacent groups with the smallest compressed size are selected, or based on any other factor. If the tightest hardware constraint is not exceeded, a merged group may be further merged with one or more other groups of coefficients.

In some examples, a full search may be performed to determine the optimum merging strategy given the available groups (from block 904) with a goal of minimising the number of groups that remain after merging and/or most closely meeting the tightest hardware constraint for each of the groups. Where a full search is performed, non-adjacent leaf nodes may, in some examples, be merged.

In describing the application of the method of FIG. 4 to the binary trees shown in FIGS. 5-6, a breadth-first approach to traversing the tree has been used, i.e. the compressed size of each group at the current depth is calculated (in block 412) and then used to determine whether the termination criteria are met (in block 414) by each group in that current depth. Even for an unbalanced tree, at each depth the compressed size of each group in a non-terminated branch is calculated (in block 412) and then used to determine whether the termination criteria are met (in block 414) by each group in a non-terminated branch in that current depth.

Figure 10:
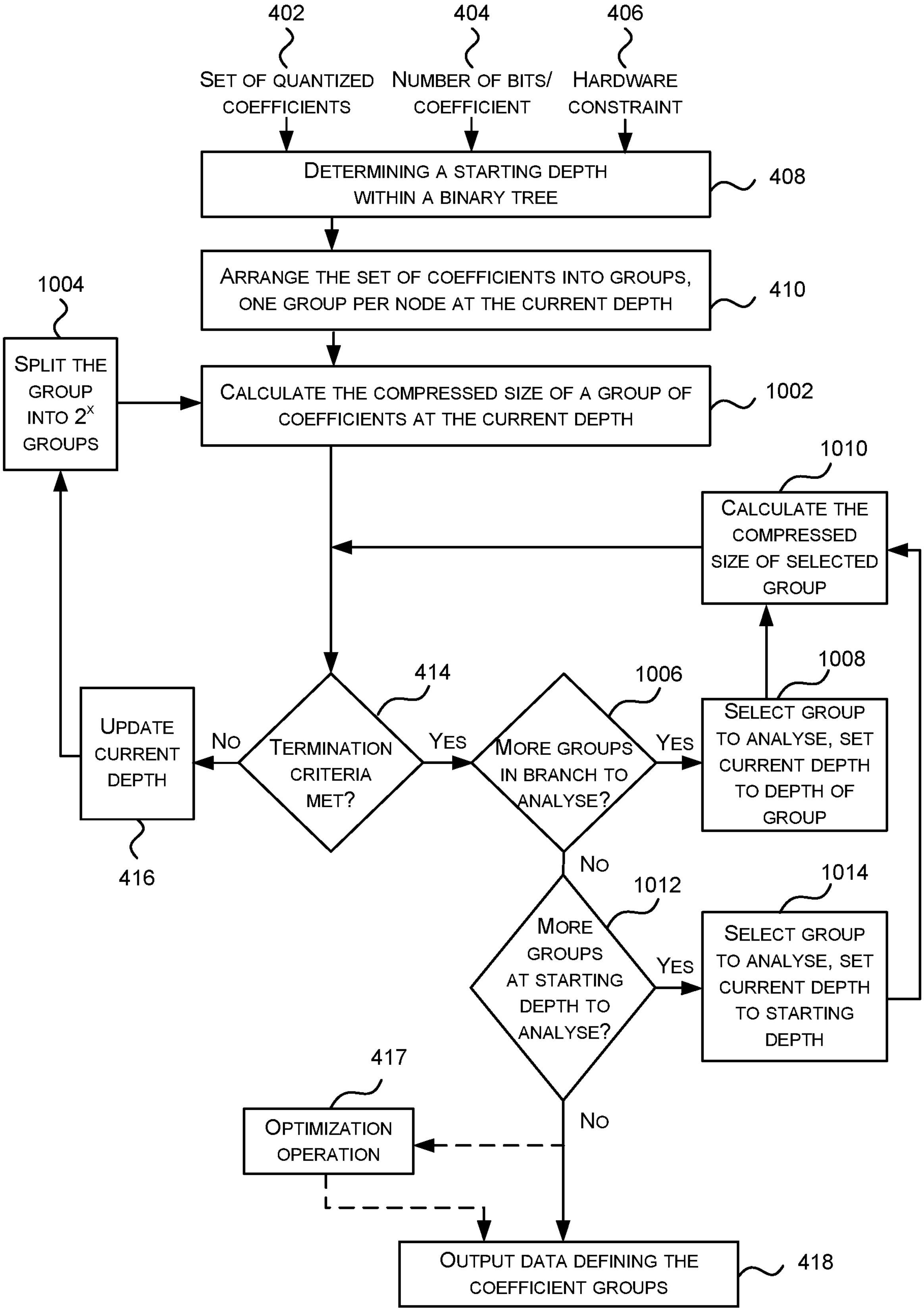
FIG. 10 shows a schematic diagram of the splitting of a set of coefficients as a binary tree is traversed downwards using a depth-first scheme.

In a variation of the method of FIG. 4, a depth-first approach may instead be used and this variation is shown in FIG. 10 for downwards traversal of a binary tree. In a depth-first approach, each branch is explored until it terminates (as a consequence of the termination criteria being met) before the next branch is explored. As shown in FIG. 10, instead of calculating the compressed size of each group at the current depth (in block 412 of FIG. 4), the compressed size of a single group at the current depth (which initially is the starting depth) is calculated (block 1002). It is then determined whether the termination criteria are satisfied for that particular group (block 414).

As described above, the termination criteria will never be satisfied for the first iteration (where the current depth is the starting depth) and so the current depth is updated (block 416) by increasing the depth by the value x. The group is then divided into 2x groups (e.g. if x=1, the group is divided into two groups) at the new depth (block 1004). The method is then repeated for a selected one of the newly formed smaller groups until the termination criteria are satisfied (Yes' in block 414).

After reaching a leaf node, it is determined whether there are any groups in the current branch (e.g. the branch from block 504) to be analysed (block 1006) and if so, a group at a closest depth to the current depth is selected and the current depth is updated to that closest depth (block 1008). The method then continues as before with the compressed size of the selected group being calculated (block 1010) and used to determine whether termination criteria are met (in block 414).

After analysing all the groups in the branch (resulting in a No' in block 1006), the method determines whether there are any groups at the starting depth that are still to be analysed (block 1012) and if so the method proceeds to analyse that group (as selected in block 1014) and any groups formed by subdivision of that group in a similar manner to the first branch to be explored all the way to the leaf nodes. Only when all branches have been explored (resulting in a No' in block 1012) is data output and as before, one or more optimizations may be applied (in block 417) before outputting the data (in block 418). The output data is generated (in block 418) in the same manner for depth-first traversal as for breadth-first traversal (as described above with reference to FIG. 4). By defining the coefficient groups, the data output (in block 418) specifies the number of hardware passes and how the coefficients are divided into these hardware passes.

Referring back to the example binary tree shown in FIG. 5, if the starting depth=1, initially the coefficients are divided into two groups 504, 506 and the compressed size of group 504 is calculated (in block 1002). As this is the first iteration, the termination criteria are not satisfied (No' in block 414), the current depth is increased by x (in block 416). For this example, x=1 and so current_depth=2. The group 504 is therefore split into two groups 508, 510 (in block 1004). The compressed size of one of these groups, group 508, is calculated and it is identified that the termination criteria are met, as indicated by the shading in FIG. 5 (Yes' in block 414).

After the termination criteria are satisfied for group 508, it is determined that there are groups in the current branch still to be analysed (Yes' in block 1006). In this example, there is a single group in the branch that has not yet been analysed, group 510. This group is selected and as it is at the same depth as the current depth, the current depth remains the same. The compressed size of group 510 is calculated (in block 1010) and using this it is determined that the termination criteria are not met, as shown in FIG. 5 by the lack of shading of group 510. As a result, the depth is increased so that current_depth=3 (in block 410) and the group 510 is divided into two groups 520, 522 (in block 1004). The compressed size of a first of these, group 520 is calculated (in block 1002) and used to determine that the termination criteria are still not met ('No' in block 414). This results in that group 520 being further subdivided (in block 1004) into two groups 560, 562 and the compressed size of the first of these smaller groups, group 560, is calculated (in block 1002).

On determining that the termination criteria are satisfied (Yes' in block 414), it is determined that there are still groups in the branch that have not been analysed (Yes' in block 1006). These un-analysed groups are groups 562 and 522. As group 562 is at the closest depth to the current depth (i.e. it is at the current depth), that group is selected (in block 1008) and the current depth remains unchanged. After determining that the compressed size of group 562 satisfies the termination criteria, group 522 is selected and found to also satisfy the termination criteria. At this point, all groups in the first branch (formed by the subdivision of group 504) have been analysed and the method returns to the unanalysed group at the starting depth, group 506, and the method is then repeated for that group, analysing group 506, followed by group 512, then group 514 and group 528 and finally group 530.

When performing depth-first traversal, as described above with reference to FIG. 10, the resulting tree is inherently unbalanced because the depth at which any branch terminates is independent of other branches in the tree. Where depth-first traversal is used but the implementation requires that all the resultant groups are the same size (as in a balanced binary tree), the maximum depth of any of the branches is used for all branches (e.g. depth=4 for the example in FIG. 5).

By using depth-first traversal, the merging optimization (of FIG. 9) may be implemented at an earlier stage, rather than at the end of the traversal. For example, at any point that the termination criteria are satisfied (in block 414 in FIG. 9), a check may be performed to see whether the resultant group can be merged with the (or any) previous group that satisfied the termination criteria (e.g. blocks 908-916 may be inserted into FIG. 9 between block 414 and block 1006). However, use of breadth-first traversal means that the sizes of all the splits are known at each depth.

Figure 11:
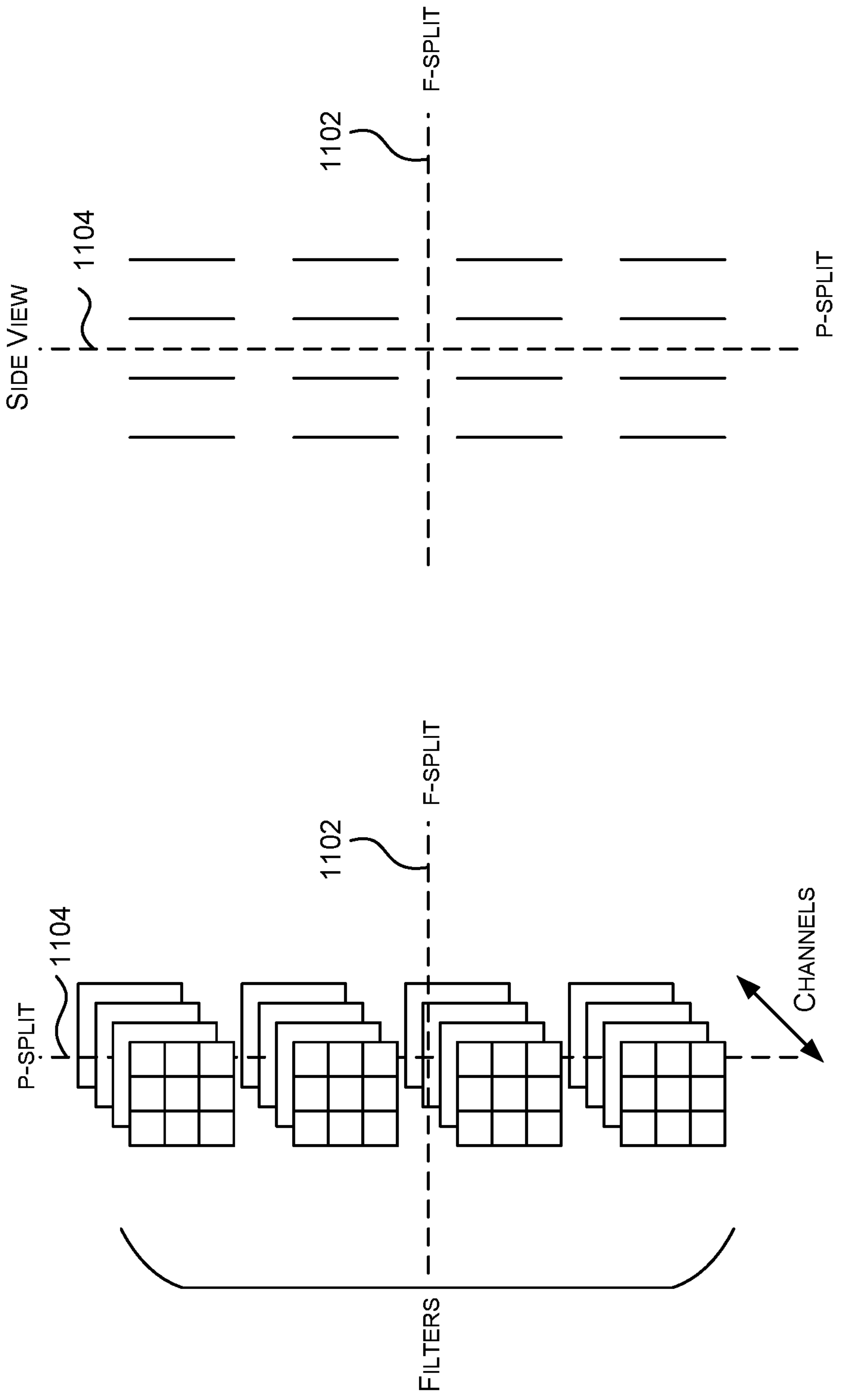
FIG. 11 is a schematic diagram showing the different ways in which an array of coefficients may be split.

The methods described above involve the splitting of the input set of coefficients 402. This set may be split in any way according to the minimum defined split size. For example, the coefficients may be visualised as a three-dimensional array with each plane corresponding to the coefficients for the filters for a single channel, as shown in FIG. 11. When splitting the input set of coefficients, the splits used may be f-splits or p-splits. Where an f-split is used, the split is in the filter dimension (dotted line 1102) and where a p-split is used, the split is in the channel dimension (dotted line 1104). In some examples only f-splits or p-splits are used and in other examples both f-splits and p-splits may be used (e.g. an f-split may be used in one iteration followed by a p-split in a next iteration). Where p-splits are used, this may affect the merging optimization, as described above with reference to FIG. 9, by restricting the merging of groups to groups that are adjacent in the binary tree (rather than allowing a totally free selection of groups to merge). Furthermore, where p-splits are used, intermediate results are saved as higher precision, then loaded in the next pass and accumulated.

The methods of splitting the input set of coefficients into passes that are described herein form part of the process of mapping a neural network to the hardware on which it will be implemented at run time. As described above, the mapping process is performed offline but the way in which it is performed can have performance implications at run time (e.g. in terms of bandwidth, latency, efficiency, power consumption, etc.). In an example the mapping process may comprise splitting the layers into the hardware passes using the methods described herein, compressing the coefficients (according to the final split data output from the splitting method) and then generating the converted neural network (e.g. generating a command stream that executes these smaller sets of operations, such as sending corresponding input and weight data to the corresponding buffers, including where necessary, saving intermediate results at higher precision and then performing accumulation of intermediate convolution results).

By using the methods described herein (which are implemented in an offline process of mapping the NN to the hardware on which it will be run), the efficiency of the hardware at run time can be significantly increased. For example, an increase of coefficient buffer use from somewhere in the range of 30%-50% (where the splitting is based on the uncompressed sizes) to close to 90% or more may be achieved. As described above, utilising the coefficient buffer more efficiently reduces the overall number of passes that are required which provides benefits such as reduced latency, reduced bandwidth and lower power consumption. For example, the number of passes that are required may be approximately halved. In addition, compared to exploring all possible combinations of splits (i.e. the first of the methods described above), the time taken to perform the offline splitting of the layers (i.e. the coefficients of the layers) into passes may be reduced by 1-2 orders of magnitude.

Figure 12:
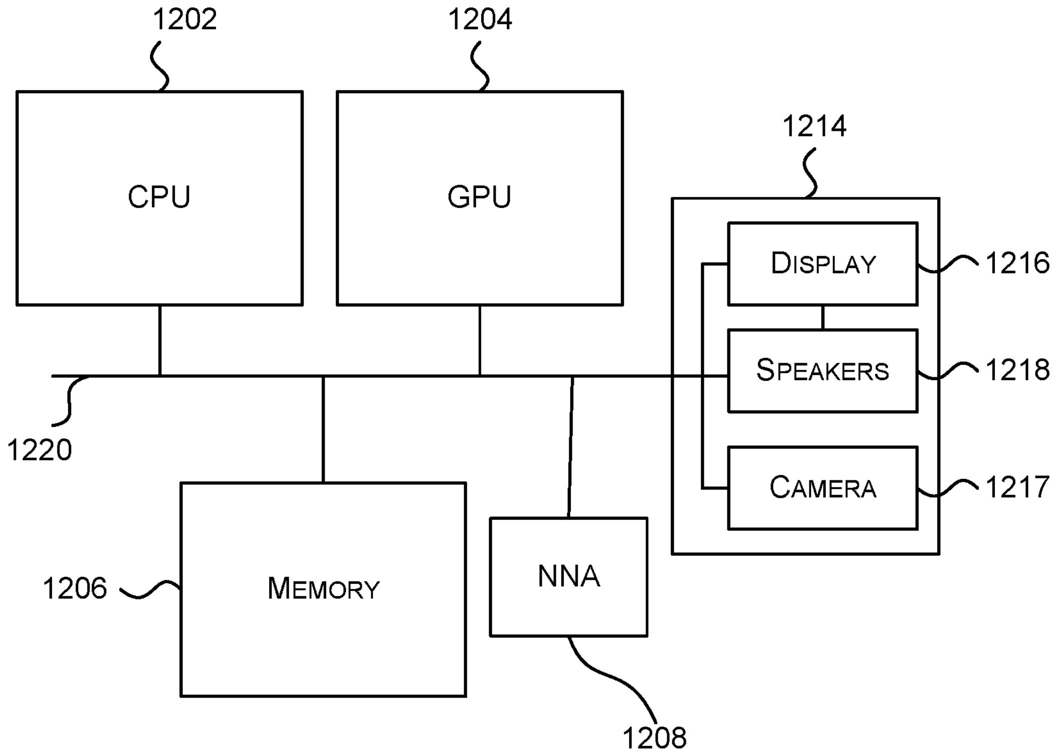
FIG. 12 shows a computer system in which the methods described herein may be implemented.

FIG. 12 shows a computer system in which the methods described herein may be implemented. The computer system comprises a CPU 1202, a GPU 1204, a memory 1206, a neural network accelerator (NNA) 1208 (for example, corresponding to NNA 100 shown in FIG. 1) and other devices 1214, such as a display 1216, speakers 1218 and a camera 1217. The components of the computer system can communicate with each other via a communications bus 1220.

The NN hardware of FIG. 1 is shown as comprising a number of functional blocks. This is schematic only and is not intended to define a strict division between different logic elements of such entities. Each functional block may be provided in any suitable manner. It is to be understood that intermediate values described herein as being formed by an element within the NN hardware need not be physically generated by the hardware at any point and may merely represent logical values which conveniently describe the processing performed by the NN hardware between its input and output.

The NN hardware described herein may be embodied in hardware on an integrated circuit. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

A further example provides a method of mapping a neural network to hardware comprising using a binary tree to assess how to split a layer of the neural network into a plurality of hardware passes, each hardware pass reading a subset of the coefficients of the layer from external memory and wherein the coefficients are stored in compressed form in the memory and each node in the binary tree corresponding to a different subset of the coefficients, wherein using the binary tree comprises: (i) determining a starting value of a current depth within the binary tree; (ii) arranging the set of coefficients into groups, each group corresponding to a node at the current depth; (iii) calculating a compressed size of at least one group of coefficients at the current depth; (iv) determining whether termination criteria are satisfied, at least one of the termination criteria being based on a comparison between the calculated compressed size and a hardware size constraint; (v) in response to determining that the termination criteria are not satisfied, updating the current depth and repeating steps (ii)-(iv); and (vi) in response to determining that termination criteria are satisfied, outputting data defining each of the plurality of hardware passes, wherein the data is dependent upon the current depth.

Determining a starting value of a current depth within the binary tree may comprise setting the starting value of the current depth to a depth of one and wherein updating the current depth comprises increasing the current depth.

Determining a starting value of a current depth within the binary tree may comprise setting the starting value of the current depth to a maximum depth of the binary tree and wherein updating the current depth comprises decreasing the current depth. The maximum depth of the binary tree may be defined by a minimum group size. The minimum group size may be defined by a compression method used to compress the coefficients for storage in the external memory.

Determining a starting value of a current depth within the binary tree may comprise: compressing all the coefficients of the layer to determine a compressed size of the layer; and dividing the compressed size of the layer by the hardware size constraint.

Outputting data defining each of the plurality of hardware passes may comprise: determining a number of coefficients in a group at the current depth; and increasing the number of coefficients in at least one group; calculating a compressed size of the at least one group; and in response to determining that the compressed size satisfies the hardware size constraint, outputting data defining each of the plurality of hardware passes based on the increased number of coefficients in the at least one group.

Calculating a compressed size of at least one group of coefficients at the current depth may comprise: calculating a compressed size of one group of coefficients at the current depth, the group of coefficients corresponding to a branch of the binary tree; and wherein in response to determining that termination criteria are satisfied, the method further comprises, prior to outputting data: repeating steps (ii)-(v) for other groups in the branch of the binary tree before repeating steps (ii)-(v) for other groups at the starting value of the current depth.

Outputting data defining each of the plurality of hardware passes may comprise: selecting two or more groups at the current depth; comparing a combined compressed size of the selected groups to the hardware constraint; in response to determining that combined compressed size satisfies the hardware size constraint, merging the groups and outputting data defining each of the plurality of hardware passes based on the merged groups.

Updating the current depth may comprise increasing the current depth and wherein the termination criteria comprise: the compressed group size does not exceed the hardware size constraint; and the current depth is greater than the starting depth plus one.

Updating the current depth may comprise decreasing the current depth and wherein the termination criteria comprise: the compressed group size exceeds the hardware size constraint; and the current depth is less than the starting depth minus one.

The hardware size constraint may comprise a size of a buffer configured to store the coefficients or a bandwidth of a connection to the external memory.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), physics processing units (PPUs), radio processing units (RPUs), digital signal processors (DSPs), general purpose processors (e.g. a general purpose GPU), microprocessors, any processing unit which is designed to accelerate tasks outside of a CPU, etc. A computer or computer system may comprise one or more processors. Those skilled in the art will realize that such processing capabilities are incorporated into many different devices and therefore the term 'computer' includes set top boxes, media players, digital radios, PCs, servers, mobile telephones, personal digital assistants and many other devices.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture NN hardware comprising any apparatus described herein. An integrated circuit definition dataset may be, for example, an integrated circuit description.

Therefore, there may be provided a method of manufacturing, at an integrated circuit manufacturing system, a NNA as described herein. Furthermore, there may be provided an integrated circuit definition dataset that, when processed in an integrated circuit manufacturing system, causes the method of manufacturing a NNA to be performed.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS® and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a NNA will now be described with respect to FIG. 13.

Figure 13:
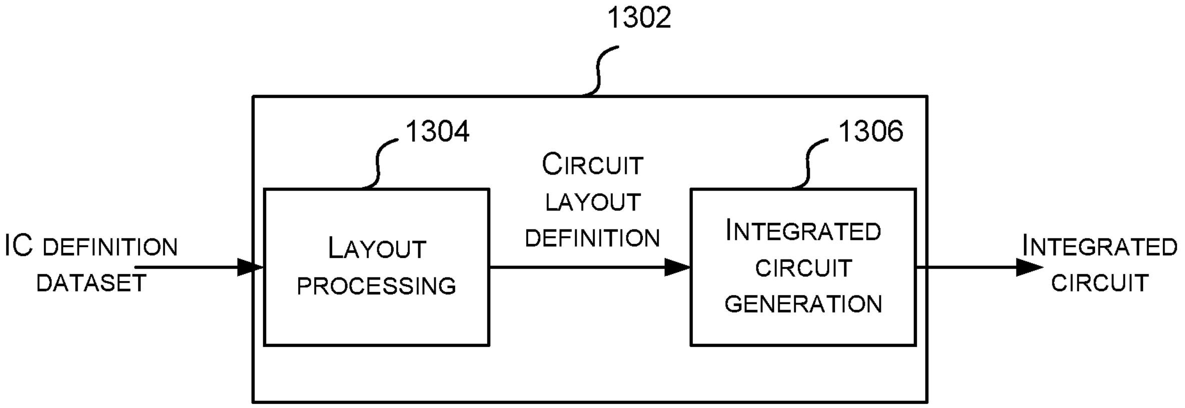
FIG. 13 shows an integrated circuit manufacturing system for generating an integrated circuit embodying the NN hardware.

FIG. 13 shows an example of an integrated circuit (IC) manufacturing system 1302 which is configured to manufacture a NNA as described in any of the examples herein. In particular, the IC manufacturing system 1302 comprises a layout processing system 1004 and an integrated circuit generation system 1306. The IC manufacturing system 1302 is configured to receive an IC definition dataset (e.g. defining a NNA as described in any of the examples herein), process the IC definition dataset, and generate an IC according to the IC definition dataset (e.g. which embodies a NNA as described in any of the examples herein). The processing of the IC definition dataset configures the IC manufacturing system 1302 to manufacture an integrated circuit embodying a NNA as described in any of the examples herein.

The layout processing system 1304 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1004 has determined the circuit layout it may output a circuit layout definition to the IC generation system 1306. A circuit layout definition may be, for example, a circuit layout description.

The IC generation system 1006 generates an IC according to the circuit layout definition, as is known in the art. For example, the IC generation system 1306 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1306 may be in the form of computer-readable code which the IC generation system 1306 can use to form a suitable mask for use in generating an IC.

The different processes performed by the IC manufacturing system 1302 may be implemented all in one location, e.g. by one party. Alternatively, the IC manufacturing system 1002 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a NNA without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 13 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 13, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

A particular reference to “logic” refers to structure that performs a function or functions. An example of logic includes circuitry that is arranged to perform those function(s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget."

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A method, performed by a processor executing computer readable code, of mapping a neural network to hardware comprising using a binary tree to assess how to split a layer of the neural network into a plurality of hardware passes, each hardware pass reading a subset of coefficients of the layer from external memory and wherein the coefficients are stored in compressed form in the memory and each node in the binary tree corresponding to a different subset of the coefficients, wherein using the binary tree to assess how to split the layer of the neural network into the plurality of hardware passes comprises:

(i) determining, by the processor, a starting value of a current depth within the binary tree;

(ii) arranging, by the processor, the set of coefficients into groups, each group corresponding to a node at the current depth;

(iii) calculating, by the processor, a compressed size of at least one group of coefficients at the current depth;

(iv) determining, by the processor, whether termination criteria are satisfied, at least one of the termination criteria being based on a comparison between the calculated compressed size and a hardware size constraint;

(v) in response to determining that the termination criteria are not satisfied, updating the current depth and repeating steps (ii)-(iv); and (vi) in response to determining that the termination criteria are satisfied, outputting data defining each of the plurality of hardware passes for the layer, wherein the data is dependent upon the current depth.

2. The method according to claim 1, wherein determining a starting value of a current depth within the binary tree comprises setting the starting value of the current depth to a depth of one and wherein updating the current depth comprises increasing the current depth.

3. The method according to claim 1, wherein determining a starting value of a current depth within the binary tree comprises setting the starting value of the current depth to a maximum depth of the binary tree and wherein updating the current depth comprises decreasing the current depth.

4. The method according to claim 3, wherein the maximum depth of the binary tree is defined by a minimum group size.

5. The method according to claim 4, wherein the minimum group size is defined by a compression method used to compress the coefficients for storage in the external memory.

6. The method according to claim 1, wherein determining a starting value of a current depth within the binary tree comprises:

compressing all the coefficients of the layer to determine a compressed size of the layer; and dividing the compressed size of the layer by the hardware size constraint.

7. The method according to claim 1, wherein outputting data defining each of the plurality of hardware passes comprises:

determining a number of coefficients in a group at the current depth; and increasing the number of coefficients in at least one group;

calculating a compressed size of the at least one group; and in response to determining that the compressed size satisfies the hardware size constraint, outputting data defining each of the plurality of hardware passes based on the increased number of coefficients in the at least one group.

8. The method according to claim 1, wherein calculating a compressed size of at least one group of coefficients at the current depth comprises:

calculating a compressed size of one group of coefficients at the current depth, the group of coefficients corresponding to a branch of the binary tree;

and wherein in response to determining that the termination criteria are satisfied, the method further comprises, prior to outputting data:

repeating steps (ii)-(v) for other groups in the branch of the binary tree before repeating steps (ii)-(v) for other groups at the starting value of the current depth.

9. The method according to claim 1, wherein outputting data defining each of the plurality of hardware passes comprises:

selecting two or more groups at the current depth;

comparing a combined compressed size of the selected groups to the hardware constraint;

in response to determining that the combined compressed size satisfies the hardware size constraint, merging the groups and outputting data defining each of the plurality of hardware passes based on the merged groups.

10. The method according to claim 1, wherein updating the current depth comprises increasing the current depth and wherein the termination criteria comprise:

the compressed group size does not exceed the hardware size constraint; and the current depth is greater than the starting depth plus one.

11. The method according to claim 1, wherein updating the current depth comprises decreasing the current depth and wherein the termination criteria comprise:

the compressed group size exceeds the hardware size constraint; and the current depth is less than the starting depth minus one.

12. The method according to claim 1, wherein the hardware size constraint comprises a size of a buffer configured to store the coefficients or a bandwidth of a connection to the external memory.

13. A non-transitory computer readable storage medium having stored thereon computer readable code configured to cause a method of mapping a neural network to hardware to be performed when the code is run, the method of mapping a neural network to hardware comprising using a binary tree to assess how to split a layer of the neural network into a plurality of hardware passes, each hardware pass reading a subset of the coefficients of the layer from external memory and wherein the coefficients are stored in compressed form in the memory and each node in the binary tree corresponding to a different subset of the coefficients, wherein using the binary tree to assess how to split the layer of the neural network into the plurality of hardware passes comprises:

(i) determining a starting value of a current depth within the binary tree;

(ii) arranging the set of coefficients into groups, each group corresponding to a node at the current depth;

(iii) calculating a compressed size of at least one group of coefficients at the current depth;

(iv) determining whether termination criteria are satisfied, at least one of the termination criteria being based on a comparison between the calculated compressed size and a hardware size constraint;

(v) in response to determining that the termination criteria are not satisfied, updating the current depth and repeating steps (ii)-(iv); and (vi) in response to determining that the termination criteria are satisfied, outputting data defining each of the plurality of hardware passes for the layer, wherein the data is dependent upon the current depth.

14. A computing device comprising:

a processor; and memory arranged to store computer readable code configured to cause a method of mapping a neural network to hardware to be performed when the code is executed by the processor, the method of mapping a neural network to hardware comprising using a binary tree to assess how to split a layer of the neural network into a plurality of hardware passes, each hardware pass reading a subset of the coefficients of the layer from external memory and wherein the coefficients are stored in compressed form in the memory and each node in the binary tree corresponding to a different subset of the coefficients, wherein using the binary tree to assess how to split the layer of the neural network into the plurality of hardware passes comprises:

(i) determining a starting value of a current depth within the binary tree;

(ii) arranging the set of coefficients into groups, each group corresponding to a node at the current depth;

(iii) calculating a compressed size of at least one group of coefficients at the current depth;

(iv) determining whether termination criteria are satisfied, at least one of the termination criteria being based on a comparison between the calculated compressed size and a hardware size constraint;

(v) in response to determining that the termination criteria are not satisfied, updating the current depth and repeating steps (ii)-(iv); and (vi) in response to determining that the termination criteria are satisfied, outputting data defining each of the plurality of hardware passes for the layer, wherein the data is dependent upon the current depth.

* * * * *